(12) United States Patent
Yoshihiro et al.

(10) Patent No.: US 10,564,323 B2
(45) Date of Patent: Feb. 18, 2020

(54) ANTIREFLECTION FILM AND METHOD OF PRODUCING THE SAME, AND OPTICAL MEMBER

(71) Applicant: FUJIFILM Corporation, Tokyo (JP)

(72) Inventors: Tatsuya Yoshihiro, Kanagawa (JP); Tadashi Kasamatsu, Kanagawa (JP); Shinichiro Sonoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 178 days.

(21) Appl. No.: 15/679,557

(22) Filed: Aug. 17, 2017

(65) Prior Publication Data
US 2017/0343705 A1    Nov. 30, 2017

Related U.S. Application Data

(63) Continuation of application No. PCT/JP2016/001017, filed on Feb. 25, 2016.

(30) Foreign Application Priority Data

Feb. 27, 2015   (JP) .................................. 2015-038975
Aug. 31, 2015   (JP) .................................. 2015-170534

(51) Int. Cl.
  *G02B 1/11*      (2015.01)
  *G02B 1/115*     (2015.01)
  (Continued)

(52) U.S. Cl.
  CPC ................ *G02B 1/115* (2013.01); *B32B 3/30* (2013.01); *B32B 7/02* (2013.01); *B32B 15/20* (2013.01); *G02B 1/118* (2013.01)

(58) Field of Classification Search
  CPC ............ G02B 1/11; G02B 1/116; G02B 1/118
  (Continued)

(56) References Cited

U.S. PATENT DOCUMENTS

2006/0199040 A1    9/2006  Yamada et al.
2007/0146868 A1    6/2007  Yamaguchi
(Continued)

FOREIGN PATENT DOCUMENTS

JP    2005-275372 A    10/2005
JP    2007-171735 A     7/2007
(Continued)

OTHER PUBLICATIONS

Japanese Office Action dated Apr. 3, 2018 for Japanese Application No. 2017-501949, with machine translation.
(Continued)

*Primary Examiner* — Audrey Y Chang
(74) *Attorney, Agent, or Firm* — Birch, Stewart, Kolasch & Birch, LLP

(57) ABSTRACT

An antireflection film includes an uneven structure layer that has an uneven structure and has an alumina hydrate as a main component, and an intermediate layer that is disposed between the uneven structure layer and a substrate. The uneven structure layer has a spatial frequency peak value of the uneven structure of 8.5 $\mu m^{-1}$ or greater and has a film thickness of 200-250 nm, and the intermediate layer comprises a plurality of layers including at least a first layer, a second layer, a third layer, and a fourth layer.

23 Claims, 19 Drawing Sheets

(51) Int. Cl.
　　　*B32B 7/02*　　(2019.01)
　　　*B32B 15/20*　　(2006.01)
　　　*B32B 3/30*　　(2006.01)
　　　*G02B 1/118*　　(2015.01)
(58) Field of Classification Search
　　　USPC .................................. 359/577, 580, 586, 601
　　　See application file for complete search history.

(56) References Cited

U.S. PATENT DOCUMENTS

| | | | |
|---|---|---|---|
| 2009/0032098 A1* | 2/2009 | Lu ...................... | C03C 17/3417 136/257 |
| 2010/0208353 A1* | 8/2010 | Okuno ............. | B29D 11/00865 359/601 |
| 2013/0011611 A1* | 1/2013 | Taguchi .................... | C09J 7/38 428/142 |
| 2013/0250421 A1 | 9/2013 | Wakabayashi et al. | |
| 2014/0016204 A1 | 1/2014 | Hakuta et al. | |
| 2015/0219798 A1 | 8/2015 | Sonoda et al. | |
| 2015/0219799 A1 | 8/2015 | Sonoda et al. | |

FOREIGN PATENT DOCUMENTS

| | | |
|---|---|---|
| JP | 2008-129153 A | 6/2008 |
| JP | 2012-1753 A | 1/2012 |
| JP | 2012-27322 A | 2/2012 |
| JP | 2012-198330 A | 10/2012 |
| JP | 2013-47780 A | 3/2013 |
| JP | 2013-228688 A | 11/2013 |
| JP | 2014-81522 A | 5/2014 |
| JP | 2015-4919 A | 1/2015 |
| JP | 2015-94878 A | 5/2015 |
| WO | WO 2014/061236 A1 | 4/2014 |
| WO | WO 2014/061237 A1 | 4/2014 |

OTHER PUBLICATIONS

International Preliminary Report on Patentability (Forms PCT/IPEA/409 and PCT/IPEA/416) issued in International Application No. PCT/JP2016/001017 dated Jun. 6, 2017, together with an English translation of Form PCT/IPEA/409.
International Search Report and Written Opinion of the International Searching Authority (Forms PCT/ISA/210 and PCT/ISA/237) issued in International Application No. PCT/JP2016/001017 dated Jun. 28, 2016, together with an English translation of the International Search Report.
Written Opinion of the IPEA (Form PCT/IPEA/408) issued in International Application No. PCT/JP2016/001017 dated Feb. 7, 2017.
Japanese Office Action and English translation dated Nov. 6, 2018 for Application No. 2017-501949.
Japanese Notice of Reasons for Refusal dated Dec. 3, 2019, for Japanese Patent Application No. 2017-501949, with English translation.

* cited by examiner

FIG. 1A
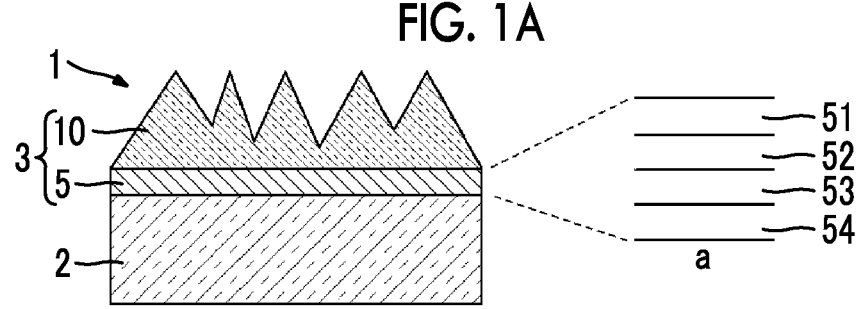
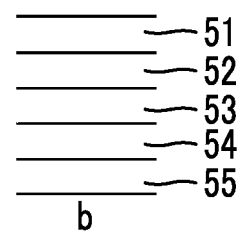
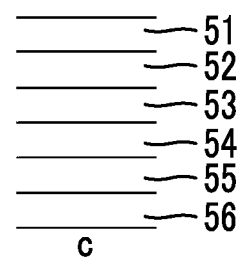
FIG. 1B
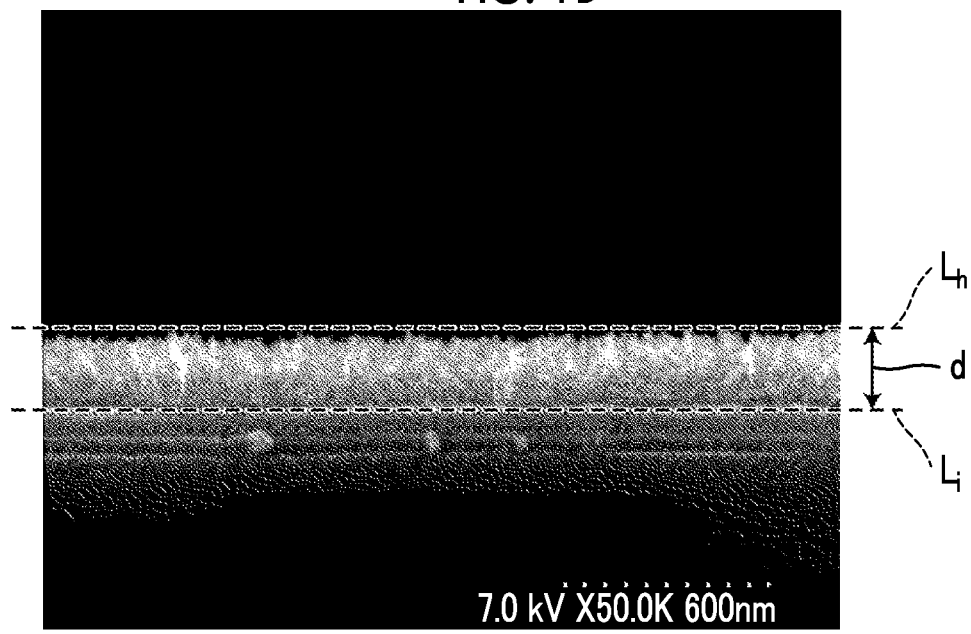

EXAMPLE 1

EXAMPLE 2

EXAMPLE 3

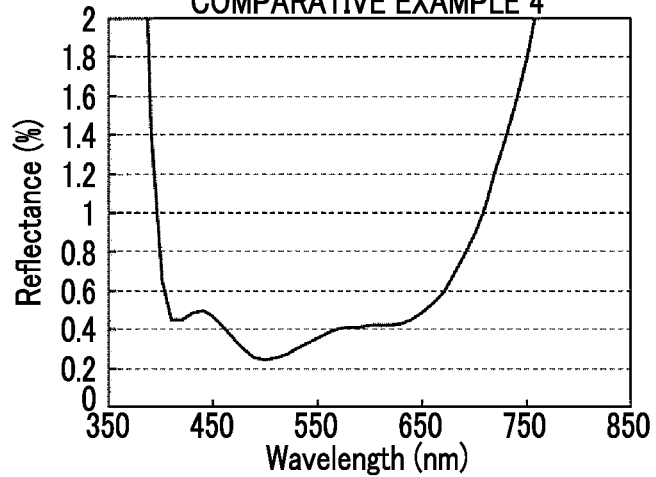
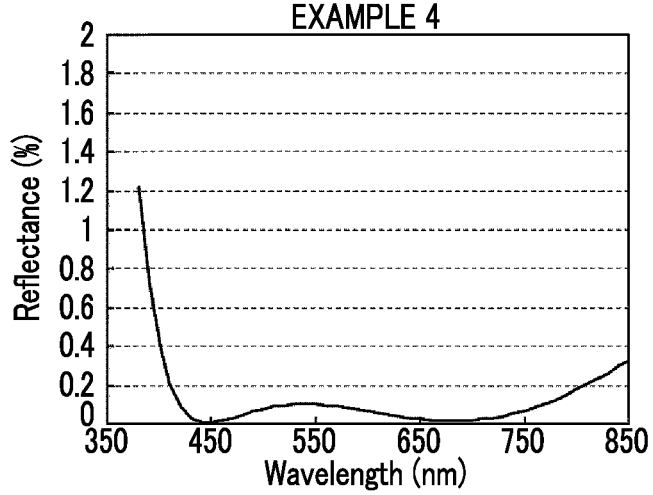
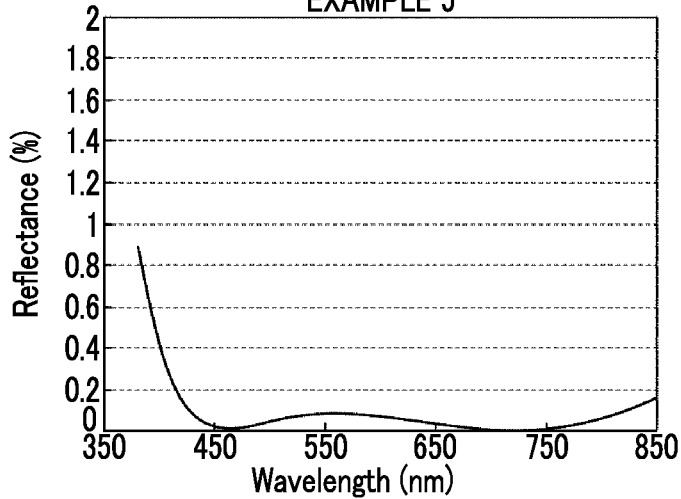

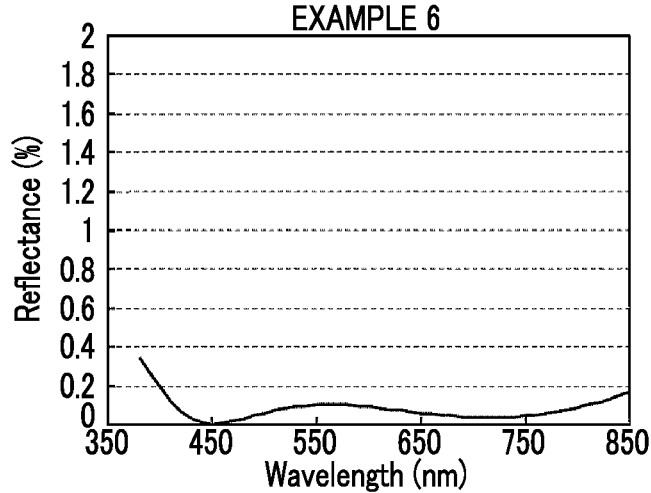
FIG. 13 EXAMPLE 6
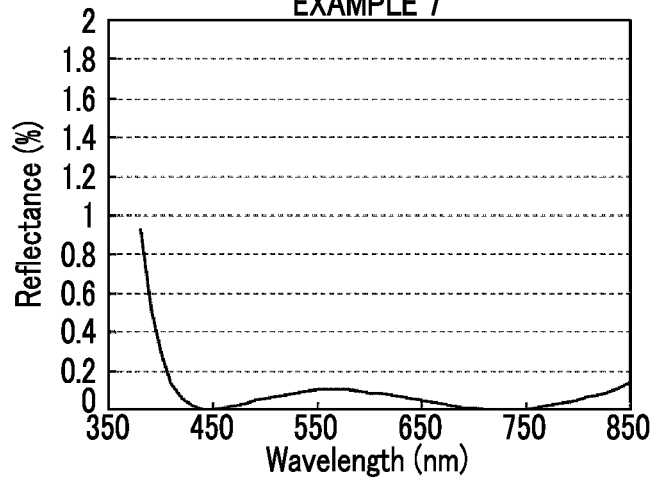
FIG. 14 EXAMPLE 7
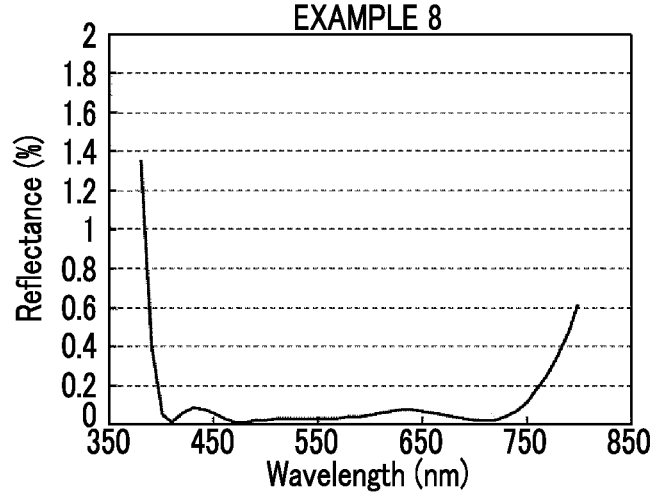
FIG. 15 EXAMPLE 8

EXAMPLE 9

EXAMPLE 10

EXAMPLE 11

EXAMPLE 12

EXAMPLE 13

EXAMPLE 14

EXAMPLE 15

EXAMPLE 16

EXAMPLE 17

EXAMPLE 18

EXAMPLE 19

EXAMPLE 20

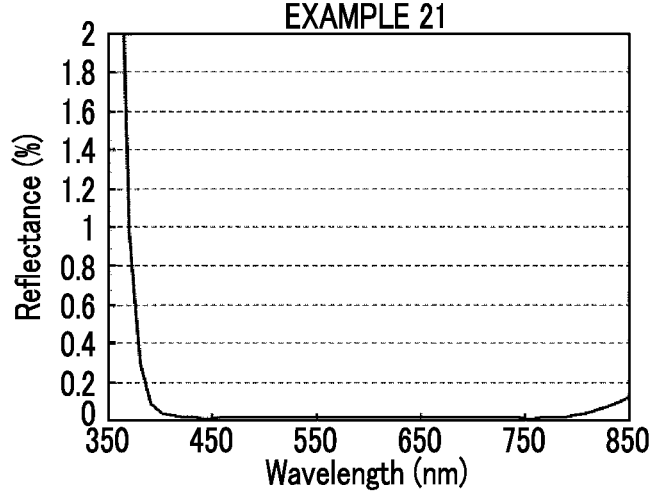
FIG. 28 EXAMPLE 21
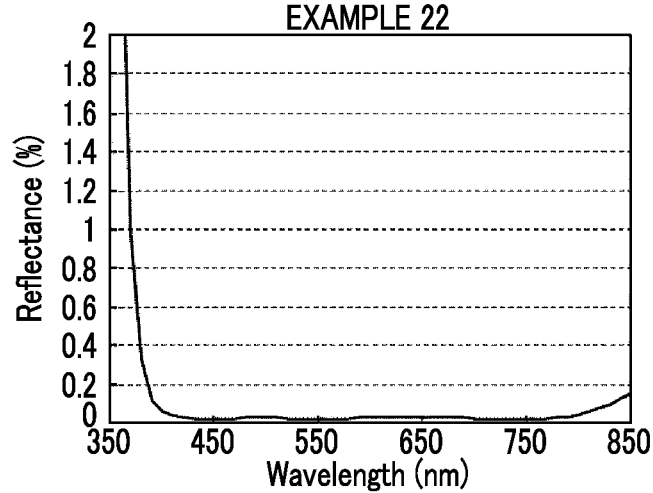
FIG. 29 EXAMPLE 22
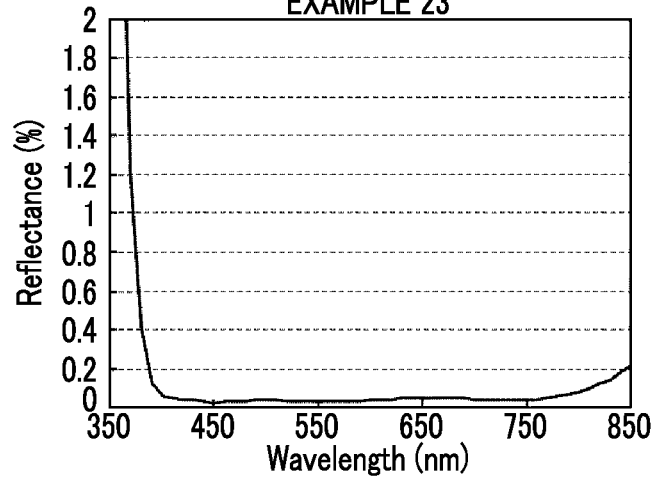
FIG. 30 EXAMPLE 23

EXAMPLE 24

EXAMPLE 25

EXAMPLE 26

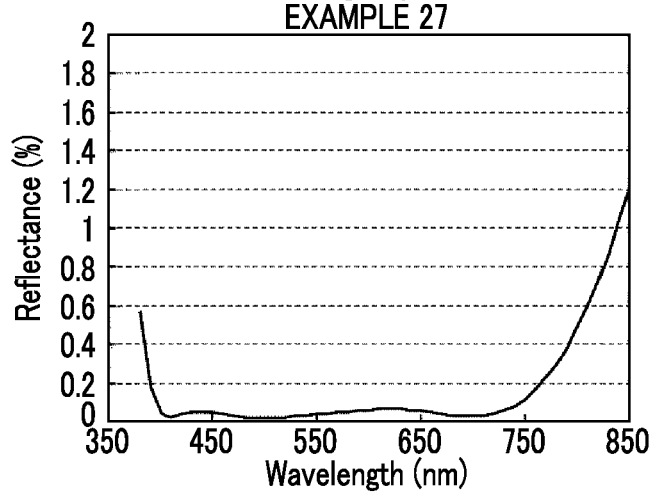
FIG. 34 EXAMPLE 27
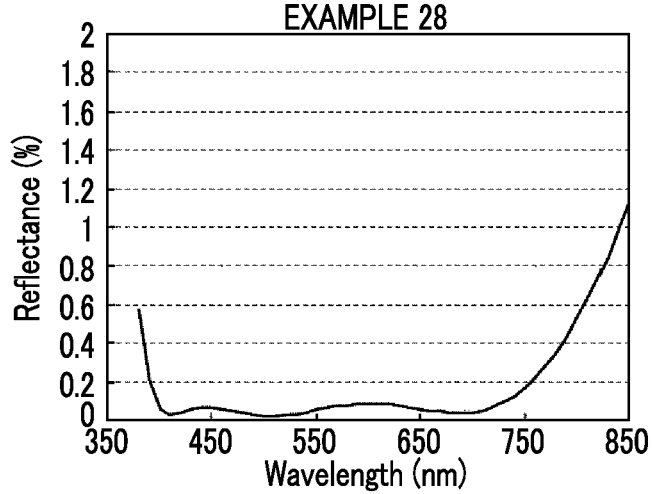
FIG. 35 EXAMPLE 28
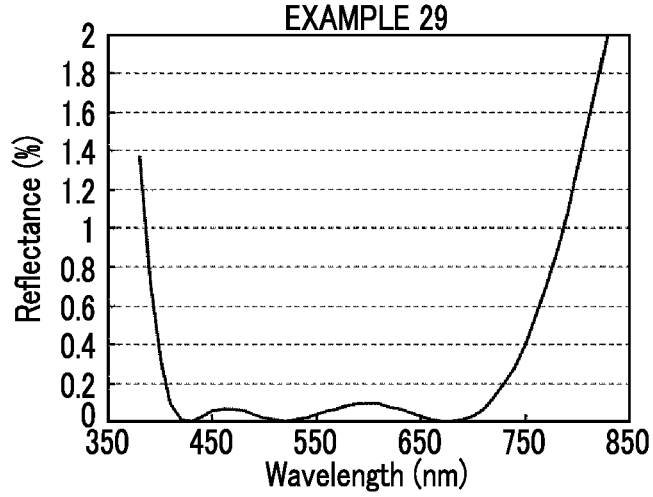
FIG. 36 EXAMPLE 29

EXAMPLE 30

EXAMPLE 31

EXAMPLE 32

EXAMPLE 33

EXAMPLE 34

EXAMPLE 35

EXAMPLE 36

EXAMPLE 37

EXAMPLE 38

EXAMPLE 39

EXAMPLE 40

EXAMPLE 41

EXAMPLE 42

EXAMPLE 43

US 10,564,323 B2

ANTIREFLECTION FILM AND METHOD OF PRODUCING THE SAME, AND OPTICAL MEMBER

CROSS-REFERENCE TO RELATED APPLICATIONS

This application is a continuation application of International Application No. PCT/JP2016/001017 filed Feb. 25, 2016, which claims priority under 35 U.S.C. § 119(a) to Japanese Patent Application No. 2015-038975, filed Feb. 27, 2015, and Japanese Patent Application No. 2015-170534, filed Aug. 31, 2015. Each of the above applications is hereby expressly incorporated by reference, in its entirety, into the present application.

BACKGROUND OF THE INVENTION

1. Field of the Invention

The present invention relates to an antireflection film including an uneven structure layer and a method for producing the same, and an optical member.

2. Description of the Related Art

In the past, in a lens (transparent substrate) using a translucent member such as glass or plastic, an antireflection film has been provided on a light incident surface in order to reduce the loss of transmitted light by surface reflection.

For example, as an antireflection structure for visible light, a dielectric material multilayer film, a fine uneven layer having a pitch shorter than a wavelength of visible light, and the like have been known (JP2005-275372A, JP2013-47780A, and JP2015-4919A and the like).

Generally, the refractive index of a material forming a fine uneven layer is different from the refractive index of a transparent substrate. Accordingly, in the case in which the material is used for antireflection of the transparent substrate, it is necessary to adjust a difference in refractive index between the uneven layer and the transparent substrate.

JP2005-275372A discloses a constitution in which a fine uneven layer, which is obtained by boehmitization of alumina, is formed on a substrate with a thin transparent film layer (intermediate layer) interposed therebetween.

In addition, JP2013-47780A discloses a constitution in which as intermediate layers between a substrate and a fine uneven layer obtained by boehmitization of alumina, two adjustment layers having an intermediate refractive index between the refractive index of the uneven layer and the refractive index of the substrate, specifically, first and second adjustment layers having a relationship of the refractive index of the substrate>the refractive index of the first adjustment layer>the refractive index of the second adjustment layer>the refractive index of the uneven layer, are arranged from the substrate side in the order of first adjustment layer and second adjustment layer.

Further, JP2015-4919A discloses a constitution having an intermediate layer of a five-layer structure.

SUMMARY OF THE INVENTION

While having conducted more intensive investigations on an antireflection structure including an uneven structure layer, the present inventors have found that when an antireflection structure includes an uneven structure layer made of an alumina hydrate, there is a problem in that slight scattering light at an unignorable level is generated and recognized as a cloud on an antireflection film forming surface in a product such as a lens so that the quality of an optical element is significantly affected by the light in some cases.

The present invention is made in consideration of the above circumstances and an object thereof is to provide an antireflection film that suppresses scattered light and maintains sufficient antireflection performance and a method of producing the same, and an optical member including an antireflection film.

A first antireflection film of the present invention that is provided on a surface of a substrate, the film comprising:
an uneven structure layer that has an uneven structure in which a distance between protrusions is shorter than a wavelength of light of which reflection is to be suppressed, and that has an alumina hydrate as a main component; and
an intermediate layer that is disposed between the uneven structure layer and the substrate,
in which the uneven structure layer has a spatial frequency peak value of the uneven structure of 8.5 $\mu m^{-1}$ or greater and has a film thickness of less than 270 nm,
the intermediate layer comprises a plurality of layers including at least a first layer, a second layer, a third layer, and a fourth layer in this order from the uneven structure layer side to the substrate side,
the first layer has a refractive index of less than 1.7 and a film thickness of 3 nm or more and 80 nm or less,
the second layer has a refractive index of 1.7 or more and a film thickness of 3 nm or more and 30 nm or less,
the third layer has a refractive index of less than 1.7 and a film thickness of 10 nm or more and 80 nm or less, and
the fourth layer has a refractive index of 1.7 or more and a film thickness of 3 nm or more and 160 nm or less.

Here, the spatial frequency peak value of the uneven structure refers to a value of a spatial frequency exhibiting the maximum intensity in the spatial frequency intensity distribution (spectrum) of the uneven structure obtained. The method of obtaining the spatial frequency intensity distribution will be described later.

A second antireflection film of the present invention that is provided on a surface of a substrate, the film comprising:
an uneven structure layer that has an uneven structure in which a distance between protrusions is shorter than a wavelength of light of which reflection is to be suppressed, and that has an alumina hydrate as a main component; and an intermediate layer that is disposed between the uneven structure layer and the substrate,
in which the uneven structure layer is obtained by treating an aluminum film with hot water and has a film thickness of less than 270 nm,
the intermediate layer comprises a plurality of layers including at least a first layer, a second layer, a third layer, and a fourth layer in this order from the uneven structure layer side to the substrate side,
the first layer has a refractive index of less than 1.7 and a film thickness of 3 nm or more and 80 nm or less,
the second layer has a refractive index of 1.7 or more and a film thickness of 3 nm or more and 30 nm or less,
the third layer has a refractive index of less than 1.7 and a film thickness of 10 nm or more and 80 nm or less, and
the fourth layer has a refractive index of 1.7 or more and a film thickness of 3 nm or more and 160 nm or less.

The term "main component" used in the specification refers to a component whose content is 90% by mass or higher among all components. In addition, the refractive index is defined as a value with respect to the light having a wavelength of 540 nm.

It is preferable that in the antireflection film of the present invention, the intermediate layer further includes a fifth layer on the substrate side of the fourth layer, and the fifth layer has a refractive index of less than 1.7 and a film thickness of 3 nm or more and 50 nm or less.

It is preferable that in the antireflection film of the present invention, the intermediate layer further includes a sixth layer on the substrate side of the fifth layer, and the sixth layer has a refractive index of 1.7 or more and a film thickness of 3 nm or more and 40 nm or less.

In the antireflection film of the present invention, the intermediate layer may further include a seventh layer having a refractive index of less than 1.7 and a film thickness of 3 nm or more and 80 nm or less on the substrate side of the sixth layer.

In the antireflection film of the present invention, the intermediate layer may further include an eighth layer having a refractive index of 1.7 or more and a film thickness of 3 nm or more and 30 nm or less on the substrate side of the seventh layer.

It is preferable that the first layer is made of silicon oxynitride.

It is preferable that the second layer is made of niobium oxide.

It is preferable that odd-numbered layers among the plurality of layers constituting the intermediate layer are formed of the same material. The odd-numbered layers refer to layers laminated in odd numbers, such as the first layer, the third layer, and the fifth layer, from the uneven structure layer side.

It is preferable that even-numbered layers among the plurality of layers constituting the intermediate layer are formed of the same material. The even-numbered layers refer to layers laminated in even numbers, such as the second layer, the fourth layer, and the sixth layer, from the uneven structure layer side.

An optical member of the present invention comprises the antireflection film, and a transparent substrate having a surface on which the antireflection film is formed.

It is preferable that a refractive index of the transparent substrate is 1.65 or more and 2.10 or less.

A method of producing an antireflection film of the present invention, the antireflection film being provided on a surface of a substrate and including an uneven structure layer that has an uneven structure in which a distance between protrusions is shorter than a wavelength of light of which reflection is to be suppressed and has an alumina hydrate as a main component, and an intermediate layer that is disposed between the uneven structure layer and the substrate, the method comprising:

forming the intermediate layer on the surface of the substrate;

forming an aluminum film having a film thickness of 10 nm or more and less than 30 nm on the outermost surface of the intermediate layer; and forming an uneven structure layer having a film thickness of less than 270 nm as the uneven structure layer by treating the aluminum film with hot water.

Here, the hot water treatment means washing the film in hot water at 70° C. or higher for 1 minute or longer. The treatment is preferably carried out by washing the film in hot water at a temperature higher than 90° C. for 1 minute or longer.

Since the first antireflection film of the present invention includes an uneven structure layer that has an uneven structure in which a distance between protrusions is shorter than a wavelength of light of which reflection is to be suppressed and has an alumina hydrate as a main component, and an intermediate layer that is disposed between the uneven structure layer and the substrate and the uneven structure layer has a spatial frequency peak value of the uneven structure of 8.5 $\mu m^{-1}$ or greater and has a film thickness of less than 270 nm, the intensity of scattered light can be significantly suppressed compared to the related art. In addition, since the intermediate layer is constituted of a plurality of layers including at least a first layer, a second layer, a third layer, and a fourth layer in this order from the uneven structure layer side to the substrate side, the first layer has a refractive index of less than 1.7 and a film thickness of 3 nm or more and 80 nm or less, the second layer has a refractive index of 1.7 or more and a film thickness of 3 nm or more and 30 nm or less, the third layer has a refractive index of less than 1.7 and a film thickness of 10 nm or more and 80 nm or less, and the fourth layer has a refractive index of 1.7 or more and a film thickness of 3 nm or more and 160 nm or less, good antireflection performance can be obtained.

Since the second antireflection film of the present invention includes an uneven structure layer that has an uneven structure in which a distance between protrusions is shorter than a wavelength of light of which reflection is to be suppressed and has an alumina hydrate as a main component, and an intermediate layer that is disposed between the uneven structure layer and the substrate, and the uneven structure layer is obtained by treating an aluminum film with hot water and has a film thickness of less than 270 nm, the intensity of scattered light can be significantly suppressed compared to the related art. In addition, since the intermediate layer is constituted of a plurality of layers including at least a first layer, a second layer, a third layer, and a fourth layer in this order from the uneven structure layer side to the substrate side, the first layer has a refractive index of less than 1.7 and a film thickness of 3 nm or more and 80 nm or less, the second layer has a refractive index of 1.7 or more and a film thickness of 3 nm or more and 30 nm or less, the third layer has a refractive index of less than 1.7 and a film thickness of 10 nm or more and 80 nm or less, and the fourth layer has a refractive index of 1.7 or more and a film thickness of 3 nm or more and 160 nm or less, good antireflection performance can be obtained.

BRIEF DESCRIPTION OF THE DRAWINGS

FIG. 1A is a schematic cross-sectional view showing a schematic constitution of an optical member according to an embodiment of the present invention.

FIG. 1B is a view for explaining a method of measuring the film thickness of an uneven structure layer.

FIG. 10 is a view showing the wavelength dependence of the reflectance of an optical member of Comparative Example 4.

FIG. 11 is a view showing the wavelength dependence of the reflectance of an optical member of Example 4.

FIG. 12 is a view showing the wavelength dependence of the reflectance of an optical member of Example 5.

FIG. 13 is a view showing the wavelength dependence of the reflectance of an optical member of Example 6.

FIG. 14 is a view showing the wavelength dependence of the reflectance of an optical member of Example 7.

FIG. 15 is a view showing the wavelength dependence of the reflectance of an optical member of Example 8.

FIG. 28 is a view showing the wavelength dependence of the reflectance of an optical member of Example 21.

FIG. 29 is a view showing the wavelength dependence of the reflectance of an optical member of Example 22.

FIG. 30 is a view showing the wavelength dependence of the reflectance of an optical member of Example 23.

FIG. 34 is a view showing the wavelength dependence of the reflectance of an optical member of Example 27.

FIG. 35 is a view showing the wavelength dependence of the reflectance of an optical member of Example 28.

FIG. 36 is a view showing the wavelength dependence of the reflectance of an optical member of Example 29.

DESCRIPTION OF THE PREFERRED EMBODIMENTS

Figure 2:
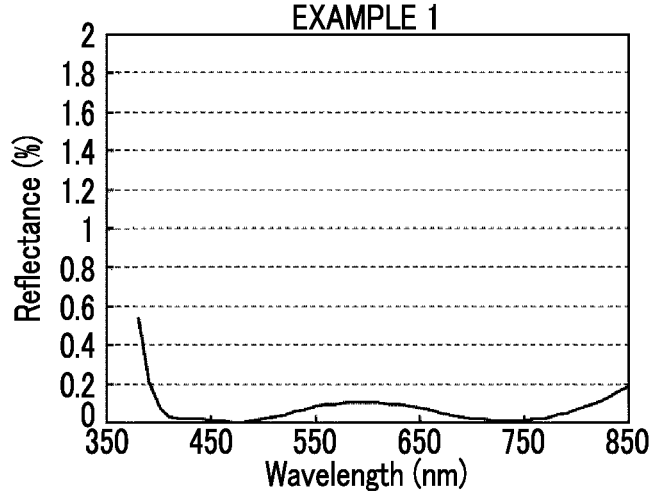
FIG. 2 is a view showing the wavelength dependence of the reflectance of an optical member of Example 1.

Hereinafter, embodiments of the present invention will be described.

FIG. 1A is a schematic cross-sectional view showing a schematic configuration of an optical member 1 including an antireflection film according to an embodiment of the present invention. As shown in FIG. 1A, the optical member 1 of the embodiment includes a transparent substrate 2, and an antireflection film 3 that is formed on a surface of the transparent substrate 2. The antireflection film 3 includes an uneven structure layer 10 that has an uneven structure in which a distance between protrusions is shorter than a wavelength of light of which reflection is to be suppressed on its surface and has an alumina hydrate as a main component, and an intermediate layer 5 that is disposed between the uneven structure layer 10 and the transparent substrate 2. The light of which reflection is to be suppressed varies depending on the purpose but is generally light in a visible light region. As necessary, light in an infrared region may also be covered. In the embodiment, light in a visible light region (particularly, at a wavelength of 450 nm to 650 nm, more preferably at a wavelength of 400 nm to 750 nm) is mainly covered. Visible light generally refers to light at a wavelength of 380 nm to 780 nm.

The shape of the transparent substrate 2 is not particularly limited and the transparent substrate is an optical element that can be used mainly in an optical device such as a flat plate, a concave lens, or a convex lens and also may be a substrate constituted by a combination of a curved surface having a positive or negative curvature and a flat surface. For the material for the transparent substrate 2, glass, plastic, and the like can be used. Here, the term "transparent" means being transparent (having an internal transmittance of about 10% or more) to a wavelength of light of which reflection is to be suppressed (reflection prevention target light) in the optical member.

The refractive index of the transparent substrate 2 is preferably 1.65 or more and 2.10 or less. As the material satisfying the above condition, specifically, optical glasses such as S-YGH51 (manufactured by Ohara Inc., refractive index: 1.759), S-LAH55V (manufactured by Ohara Inc., refractive index: 1.840), S-TIH6 (manufactured by Ohara Inc., refractive index: 1.814), S-LAH58 (manufactured by Ohara Inc., refractive index: 1.889), S-LAH79 (manufactured by Ohara Inc., refractive index: 2.013), and EDS90 (manufactured by HOYA Corporation, refractive index: 1.857) and optical resins such as MR-10 (manufactured by Mitsui Chemicals, Inc., refractive index: 1.67) may be exemplified.

The uneven structure layer 10 has a spatial frequency peak value of greater than 8.5 μm of the uneven structure on the surface thereof and has a film thickness of less than 270 nm. Here, the uneven structure layer 10 may include a flat layer in the uneven structure (intermediate layer side). The alumina hydrate constituting the uneven structure layer 10 is boehmite (denoted as $Al_2O_3 \cdot H_2O$ or AlOOH) which is an alumina monohydrate, bayerite (denoted as $Al_2O_3 \cdot 3H_2O$ or $Al(OH)_3$) which is an alumina trihydrate (aluminum hydroxide), or the like.

The uneven structure layer 10 is transparent and has various sizes of protrusions (sizes of apex angles) and directions thereof but has a substantially saw-teeth-shaped cross section. The distance between the protrusions of the uneven structure layer 10 is a distance between the apexes of the most adjacent protrusions with a recess interposed therebetween. The distance is equal to or less than the wavelength of the light of which reflection is to be suppressed and is in an order of several tens of nanometers to several hundreds of nanometers. The distance is preferably 150 nm or less and more preferably 100 nm or less. The uneven structure layer 10 has the largest void and is loosened on the surface side being in contact with an air layer, and has a region in which the refractive index is gradually increased from 1.0 in a thickness direction from the surface side in contact with the air layer to the substrate side.

The average distance between the protrusions is obtained by photographing a surface image of the fine uneven structure with a scanning electron microscope (SEM), subjecting the image to image processing to binarize the image, and carrying out statistical processing.

The uneven structure of the uneven structure layer 10 has a random shape but the present inventors have found that when there is a fluctuation in the long wavelength of about the wavelength of light, the fluctuation becomes a cause of generating scattered light. The degree of fluctuation in the long wavelength of the fine uneven structure can be estimated from the Fourier transform of the structure pattern. The spatial frequency intensity spectrum can be calculated by subjecting an electron microscope image obtained by observing the uneven structure pattern from the top surface to discrete Fourier transformation and the spatial frequency which is the intensity peak thereof (spatial frequency peak value) gives the standard of the structure size. The inventors have found that as the spatial frequency peak value becomes closer to a high-frequency side, the intensity of scattered light becomes smaller (JP2014-196274: unpublished at the time of application).

It is known that the uneven structure layer made of an alumina hydrate is generally obtained by forming a compound including aluminum, particularly, alumina, into a thin film, and treating the film with hot water. It is considered that the spatial frequency peak value of the uneven structure depends on a process of self-organizing boehmite which is an alumina hydrate, but according to the investigations of the present inventors, even when the conditions for the hot water treatment including the time of the hot water treatment, the temperature of the water used in the hot water treatment, the pH of the water used in the hot water treatment, and the like are changed, the spatial frequency peak value is not significantly changed. At this time, it has been newly found that the spatial frequency peak value can be significantly shifted to a high-frequency side compared to the related art by reducing the film thickness using aluminum as the material for the precursor of the uneven structure layer instead of alumina in the related art. Generally, when a film which becomes a precursor is made thin, the height of the uneven structure is reduced and thus it is considered that antireflection performance becomes poor. However, it has been found that even when the film thickness of the uneven structure layer is reduced by making the thin aluminum film thin by providing an appropriate intermediate layer, good antireflection performance can be maintained.

Further, it has been found that the generation of scattered light can be drastically reduced by making the thin aluminum film thin. That is, it has become clear from the investigations of the present inventors that the uneven structure layer that can be obtained by forming a thin aluminum film having a film thickness of less than 30 nm as a precursor thereof and carrying out a hot water treatment by immersing the thin aluminum film having a film thickness of 30 nm or more in hot water at 70° C. or higher for 1 minute or longer has a significantly reduced amount of scattered light compared to an uneven structure layer obtained using a thin aluminum film having a film thickness of 30 nm or more (refer to Examples which will be described later). The film thickness of the thin aluminum film is preferably 10 nm or more and more preferably 15 nm or more and 20 nm or less.

In addition, in order not to inhibit a reaction for producing an alumina hydrate, the electric resistivity of pure water which becomes the raw material for the treatment liquid at the time of hot water treatment is preferably 10 MΩ·cm or more at a water temperature of 25° C. Further, it is preferable that after an aluminum film is formed by vapor phase film formation of vacuum deposition, plasma sputtering, electron cyclotron sputtering, ion plating, or the like, the film is treated with hot water.

In the case in which the thin aluminum film having a film thickness of less than 30 nm is treated with hot water, the film thickness of the obtained uneven structure layer 10 is less than about 270 nm. From the viewpoint of antireflection performance, the film thickness of the uneven structure layer is preferably more than 100 nm and more preferably 140 nm or more. From the viewpoint of both suppression of scattered light and antireflection performance, the film thickness thereof is preferably 140 nm or more and 250 nm or less and most preferably 200 nm or more and 250 nm or less. Here, the film thickness of the uneven structure layer 10 is defined as a thickness from the position of the interface with the intermediate layer to the protrusion distal end. The film thickness can be measured from the electron microscope image of the cross section of a sample.

The specific method of measuring the film thickness of the uneven structure layer will be described with reference to FIG. 1B. FIG. 1B is an electron microscope image obtained by photographing the cross section of the antireflection film of Comparative Example 1 which will be described later with a scanning electron microscope S-4100 (Hitachi) at a magnification of 50,000 times.

Since the intermediate layer does not have a structure in the in-plane direction along the laminated surface (the left and right direction in the image of FIG. 1B) and the uneven structure layer has a structure in the in-plane direction, the interface between a region having a structure and a region not having a structure in the in-plane direction in the in-plane direction in the electron microscope image of the cross section of the sample is defined as the interface between the intermediate layer and the uneven structure layer. Next, among the lines parallel with a linear line $L_i$ denoting the interface between the intermediate layer and the uneven structure layer, a linear line passing through the region in which the uneven structure layer is present and having the longest distance from the linear line $L_i$ is defined as a linear line $L_h$ passing through the protrusion distal end of the uneven structure layer. At this time, a distance d between the two parallel linear lines $L_i$ and $L_h$ is defined as the film thickness of the uneven structure layer. It is required that the electron microscope image used for measuring the film thickness of the uneven structure layer is photographed over a region of at least 1 μm or more in the in-plane direction as a photographing range.

As shown in a of FIG. 1A, the intermediate layer 5 is constituted of a plurality of layers including at least a first layer 51, a second layer 52, a third layer 53, and a fourth layer 54 in this order from the uneven structure layer 10 side to the substrate 2 side. At this time, the first layer 51 has a refractive index of less than 1.7 and a film thickness of 3 nm or more and 80 nm or less, the second layer 52 has a refractive index of 1.7 or more and a film thickness of 3 nm or more and 30 nm or less, the third layer 53 has a refractive index of less than 1.7 and a film thickness of 10 nm or more and 80 nm or less, and the fourth layer 54 a refractive index of 1.7 or more and a film thickness of 3 nm or more and 160 nm or less.

The intermediate layer 5 has a structure formed by laminating at least 4 or more layers including the above-described first layer 51 to fourth layer 54 and the intermediate layer may include a fifth layer 55 as shown in b of FIG. 1A or may further include a fifth layer 55 and a sixth layer 56 as shown in c of FIG. 1A. Here, the fifth layer 55 has a refractive index of less than 1.7 and a film thickness of 3 nm or more and 50 nm or less, and the sixth layer 56 has a refractive index of 1.7 or more and a film thickness of 3 nm or more and 40 nm or less.

The intermediate layer 5 may include seven or more layers. In this case, for the seventh layer and the subsequent layers, a layer having a refractive index of less than 1.7 (hereinafter, sometimes referred to as a "low refractive index layer" below) and a layer having a refractive index of 1.7 or more (hereinafter, sometimes referred to as a "high refractive index layer") may be alternately arranged. It is preferable that the seventh layer has a refractive index of less than 1.7 and a film thickness of 3 nm or more and 80 nm or less and the eighth layer has a refractive index of 1.7 or more and a film thickness of 3 nm or more and 30 nm or less. A difference in refractive index between the low refractive index layer and the high refractive index layer is preferably about 0.5 to 1.2 and more preferably about 0.8 to 0.9.

In the intermediate layer 5, a preferable lower limit of the refractive index of the low refractive index layer is 1.38, a preferable upper limit of the refractive index of the high refractive index is 2.70, and a more preferable upper limit of the high refractive index layer is 2.40.

The odd-numbered layers having a refractive index of less than 1.7 may not have the same material and the same refractive index, but it is preferable that the layers are formed of the same material and have the same refractive index from the viewpoint of suppressing material costs, film formation costs, and the like. Similarly, the even-numbered layers having a refractive index of 1.7 or more may not have the same refractive index and the same refractive, but it is preferable that the layers are formed of the same material and have the same refractive index from the viewpoint of suppressing material costs, film formation costs, and the like.

Examples of materials for the layer having a low refractive index include silicon oxide, silicon oxynitride, gallium oxide, aluminum oxide, lanthanum oxide, lanthanum fluoride, and magnesium fluoride.

Examples of materials for the layer having a high refractive index include niobium oxide, silicon niobium oxide, zirconium oxide, tantalum oxide, silicon nitride, and titanium oxide.

The first layer 51 is preferably made of silicon oxynitride (SiON). SiON can satisfy a refractive index of less than 1.7 by appropriately setting the composition ratio of Si, O, and N. In the specification, SiON does not mean that Si:O:N is 1:1:1 but simply means a compound including Si, O, and N, and means having a composition ratio at which the refractive index thereof can be obtained in the case of indicating the refractive index when combining these elements.

In addition, the second layer 52 is preferably made of niobium oxide (particularly, niobium pentaoxide $Nb_2O_5$).

In the film formation of each layer of the intermediate layer 5, a vapor phase film forming method such as vacuum deposition, plasma sputtering, electron cyclotron sputtering, ion plating, or meta-mode sputtering is preferably used. According to the vapor phase film formation, laminated structures having various refractive indices and layer thicknesses can be easily formed.

In the case of the antireflection film including a thin uneven structure layer having a film thickness of less than 270 nm, the intermediate layer 5 having the above constitution can be widely used to maintain antireflection performance. In the uneven structure layer, even when the spatial frequency peak value of the uneven structure thereof is less than 8.5 there is a case in which the film thickness is small and in this case, the intermediate layer 5 can be applied.

In the above embodiment, the optical member 1 in which the antireflection film 3 was formed on the surface of the transparent substrate 2 is described, but the antireflection film of the present invention can be formed on any member having a surface in which light reflection is to be prevented to be used. For example, it is also considered that absorption performance is improved by providing the antireflection film on the surface of an absorbent that absorbs more than 90% of incident light to prevent light reflection.

EXAMPLES

Hereinafter, while describing Examples and Comparative Examples of the present invention, the constitutions and effects of the present invention will be described in detail.

Example 1

Each three layers of a niobium oxide layer (Nb$_2$O$_5$, refractive index: 2.351) as a high refractive index layer and a silicon oxynitride layer (SiON, refractive index: 1.511) as a low refractive index layer of an intermediate layer were alternately laminated on a concave lens (curvature radius: 17 mm) of a substrate S-NBH5 (manufactured by Ohara Inc., refractive index: 1.659), and a thin aluminum film having a film thickness of 20 nm was formed on the silicon oxynitride layer as the precursor of the uneven structure layer. That is, for the intermediate layer, first to sixth layers were provided. The layer structure from the substrate to the thin aluminum film was as shown in Table 1 below. In Table 1, the refractive index and film thickness of each layer are designed values and sputtering conditions and sputtering time for obtaining the refractive index and the film thickness shown in the table are set from a relationship of the sputtering conditions such as a target composition and a gas flow rate at the time of sputtering, and the refractive index and a relationship of the thickness of the formed film and the sputtering time obtained in advance to form a film. The same is applied to Examples 2 to 13 and Comparative Examples. The film thicknesses are all physical film thicknesses.

Then, a hot water treatment was carried out by immersing the film in hot water heated to 100° C. for 3 minutes to prepare an uneven structure layer having a transparent uneven structure having an alumina hydrate as a main component. Thus, an optical member including an antireflection film of Example 1 was obtained.

Here, the silicon oxynitride and niobium oxide were formed into films by meta-mode sputtering and the aluminum film was formed by radio frequency (RE) sputtering. As the liquid used in the hot water treatment, pure water having an electric resistivity of 12 MΩ·cm was used. The electric resistivity of the liquid used in the hot water treatment was measured at a water temperature of 25° C. using an electric resistivity meter HE-200R (HORIBA).

TABLE 1

| Example 1 | Material | Refractive index | Film thickness (nm) |
|---|---|---|---|
| Precursor | Al | | 20 |
| First layer | SiON | 1.511 | 10 |
| Second layer | Nb$_2$O$_5$ | 2.361 | 6 |
| Third layer | SiON | 1.511 | 75 |
| Fourth layer | Nb$_2$O$_5$ | 2.361 | 14 |
| Fifth layer | SiON | 1.511 | 48 |
| Sixth layer | Nb$_2$O$_5$ | 2.361 | 8 |
| Substrate | S-NBH5 | 1.659 | — |

The wavelength dependence of the reflectance of the antireflection film in the optical member including the antireflection film of the example (hereinafter, referred to as "wavelength dependence of the reflectance of the optical member") was measured using a spectrographic film thickness meter FE-3000 (manufactured by Otsuka Electronics Co., Ltd.). The measurement of the reflectance was carried out under the condition at an incident angle of 0°. The measurement was carried out in the same manner as in Examples and Comparative Example 4 below. The measurement results are shown in FIG. 2. As shown in FIG. 2, the antireflection film of the example exhibited a reflectance of 0.1% or less over a wide range including the entire visible light region of a wavelength of 400 nm to 800 nm and good antireflection properties were obtained.

Example 2

An optical member including an antireflection film of Example 2 was prepared in the same procedures as in the production method of Example 1 except that a concave lens (curvature radius: 17 mm) made of S-LAH55V (manufactured by Ohara Inc., refractive index: 1.840) was used as the substrate and the film thickness of the thin aluminum film as the precursor of the uneven structure layer was set to 15 nm. The intermediate layer was formed to have a six-layer structure of first to sixth layers as in Example 1. The odd-numbered layers of first, third and fifth layers were made of silicon oxynitride and the even-numbered layers of second, fourth and sixth layers were made of niobium oxide. However, the film thickness of each layer was different from the film thickness of each layer in Example 1. The layer constitution from the substrate to the thin aluminum film is as shown in Table 2 below.

TABLE 2

| Example 2 | Material | Refractive index | Film thickness (nm) |
|---|---|---|---|
| Precursor | Al | | 15 |
| First layer | SiON | 1.511 | 71 |
| Second layer | Nb$_2$O$_5$ | 2.361 | 6 |
| Third layer | SiON | 1.511 | 35 |
| Fourth layer | Nb$_2$O$_5$ | 2.361 | 12 |
| Fifth layer | SiON | 1.511 | 25 |
| Sixth layer | Nb$_2$O$_5$ | 2.361 | 7 |
| Substrate | S-LAH55V | 1.840 | — |

Figure 3:
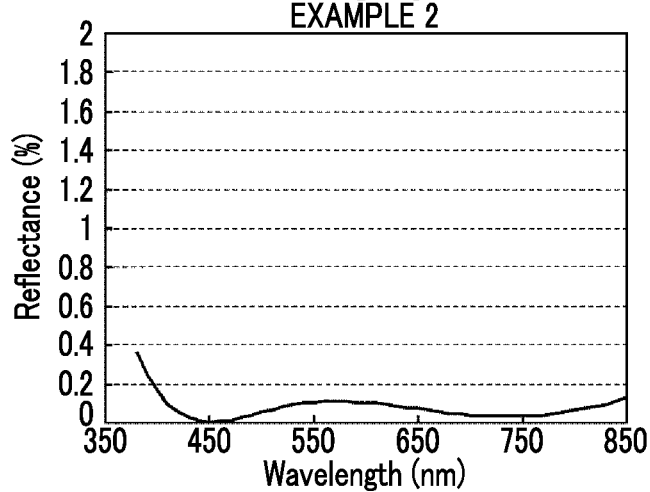
FIG. 3 is a view showing the wavelength dependence of the reflectance of an optical member of Example 2.

The wavelength dependence of the reflectance of Example 2 is shown in FIG. 3. As shown in FIG. 3, the antireflection film of Example 2 exhibited a reflectance of 0.1% or less over a wide range including the entire visible light region of a wavelength of 400 nm to 800 nm and good antireflection properties were obtained.

Example 3

An optical member including an antireflection film of Example 3 was prepared in the same procedures as in the production method of Example 1 except that a concave lens (curvature radius: 17 mm) made of S-LAH55V (manufactured by Ohara Inc., refractive index: 1.840) was used as the substrate and the film thickness of the thin aluminum film as the precursor of the uneven structure layer was set to 10 nm. The intermediate layer was formed to have a six-layer structure of first to sixth layers similar to Example 1. The odd-numbered layers of first, third and fifth layers were made of silicon oxynitride and the even-numbered layers of second, fourth, and sixth layers were made of niobium oxide. However, the film thickness of each layer was different from the film thickness of each layer in Example 1. The layer constitution from the substrate to the thin aluminum film is as shown in Table 3 below.

TABLE 3

| Example 3 | Material | Retractive index | Film thickness (nm) |
|---|---|---|---|
| Precursor | Al | | 10 |
| First layer | SiON | 1.511 | 58 |
| Second layer | Nb$_2$O$_5$ | 2.361 | 24 |
| Third layer | SiON | 1.511 | 19 |
| Fourth layer | Nb$_2$O$_5$ | 2.361 | 49 |
| Fifth layer | SiON | 1.511 | 19 |

TABLE 3-continued

| Example 3 | Material | Retractive index | Film thickness (nm) |
|---|---|---|---|
| Sixth layer | Nb₂O5 | 2.361 | 20 |
| Substrate | S-LAH55V | 1.840 | — |

Figure 4:
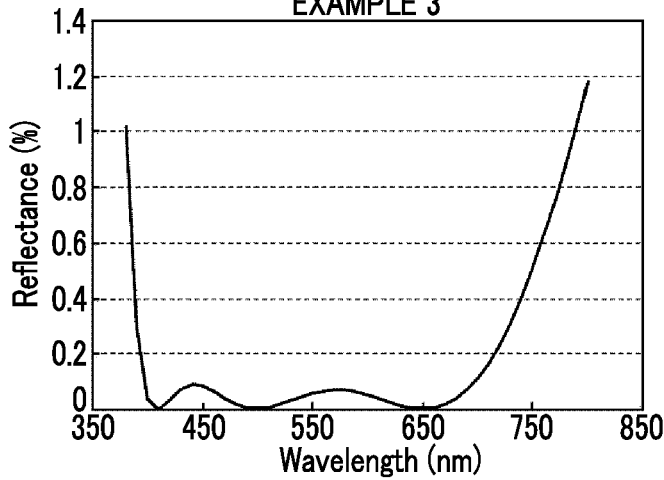
FIG. 4 is a view showing the wavelength dependence of the reflectance of an optical member of Example 3.

The wavelength dependence of the reflectance of Example 3 is shown in FIG. 4. As shown in FIG. 4, the antireflection film of Example 3 exhibited a reflectance of 0.1% or less over a wide range including the entire visible light region of a wavelength of 400 nm to 700 nm and good antireflection properties were obtained.

Comparative Example 1

An optical member including an antireflection film of Comparative Example 1 was prepared in the same procedures as in the production method of Example 1 except that the film thickness of the thin aluminum film was set to 30 nm.

Comparative Example 2

An optical member including an antireflection film of Comparative Example 2 was prepared in the same procedures as in the production method of Example 1 except that the film thickness of the thin aluminum film was set to 40 nm.

Comparative Example 3

An optical member including an antireflection film of Comparative Example 3 was prepared in the same procedures as in the production method of Example 1 except that the film thickness of the thin aluminum film was set to 50 nm.

Figure 5:
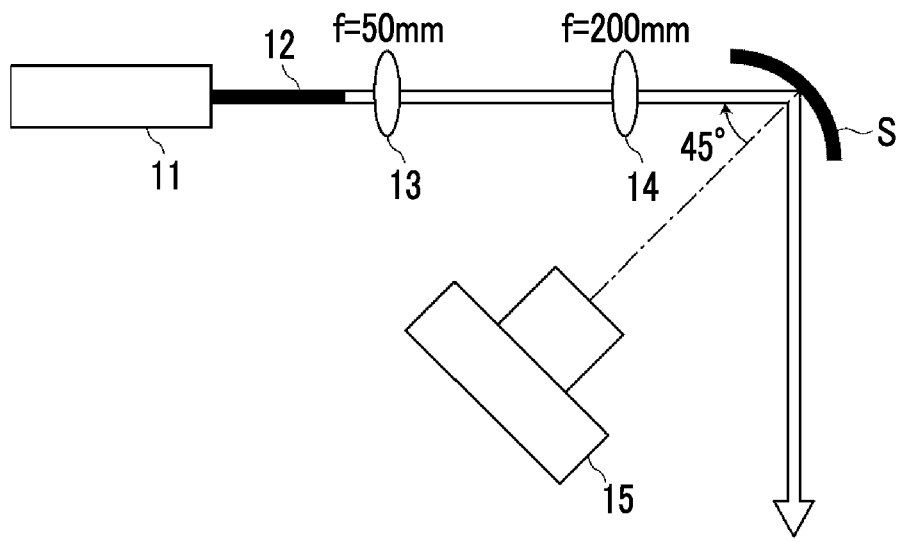
FIG. 5 is an explanatory view of a method of measuring scattered light.

In Examples 1 to 3 and Comparative examples 1 to 3 prepared as described above, the amount of scattered light was measured. FIG. 5 is a schematic view showing a method of measuring the intensity of scattered light. The intensity of scattered light was measured in the following procedures.

As shown in FIG. 5, light emitted from a halogen light source 11 (LA-150FBU: manufactured by Hayashi Watch Co., Ltd.) was guided with an optical fiber 12 having a core diameter of 600 μm, then collimated by a lens 13 (focal length f=50 mm), and converged by a lens 14 (focal length f=200 mm) at an incident angle of 45° with respect to the surface of the uneven structure layer of the optical member in each example indicated by a sample S. The sample surface was photographed by a complementary metal oxide semiconductor (CMOS) camera 15 (ARTCAM-900MI: manufactured by ARTRAY. CO., LTD.) equipped with a camera lens having a focal length f=8 mm and an F value of 1.4 while setting the global gain to 64 and the shutter speed value to 2,400. The average value of the pixel values of a 128×128 pixel light converged region obtained by subtracting the background value was set to a value of the amount of scattered light.

Figure 6:
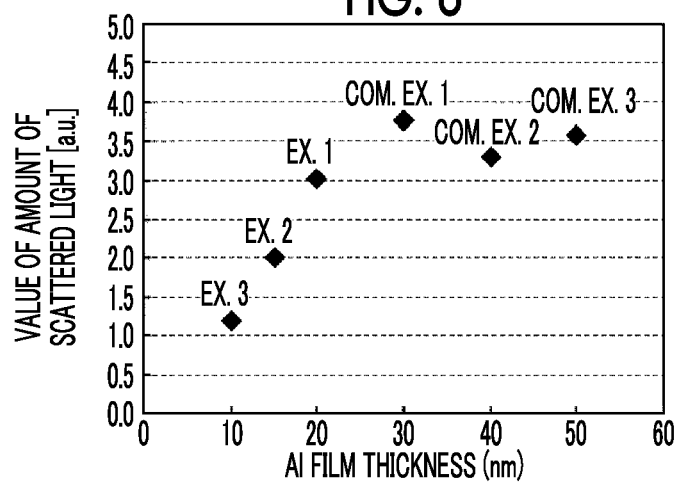
FIG. 6 is a view showing a relationship between the film thickness of a thin aluminum film and the amount of scattered light.

FIG. 6 is a view showing a relationship between the film thickness of the thin aluminum film at the time of film formation and the amount of scattered light obtained by the above measurement in each example. As shown in FIG. 6, it was clear that with a film thickness of 30 nm of the thin aluminum film to be formed as the precursor as a boundary, a decrease in the amount of scattered light becomes significant. It was clear that in order to reduce the amount of scattered light, it is preferable that the film thickness of the thin aluminum film is set to less than 30 nm and more preferably set to 20 nm or less. In addition, it could be confirmed that at a film thickness of less than 30 nm of the thin aluminum film, as the film thickness is decreased to at least 10 nm, the amount of scattered light is reduced.

Figure 7:
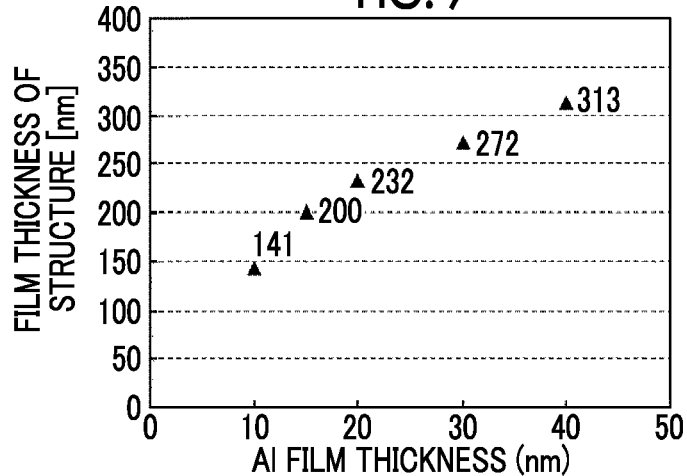
FIG. 7 is a view showing a relationship between the film thickness of a thin aluminum film and the film thickness of an uneven structure layer.

A relationship between the film thickness of the thin aluminum film (Al film thickness [nm]) formed as the precursor of each of Examples 1 to 3 and Comparative Examples 1 and 2 and the film thickness of the uneven structure layer of each antireflection film (structure film thickness [nm]) is shown in FIG. 7. The film thickness of the uneven structure layer was obtained according to the aforementioned method from the electron microscope image photographed with a scanning electron microscope S-4100 (Hitachi) at a magnification of 50,000 times. The numerical values in FIG. 7 are values of measured film thicknesses of the uneven structure layers in each example. As shown in FIG. 7, it is clear that as the film thickness of the thin aluminum film decreases, the film thickness of the uneven structure layer decreases. In addition, it was found that when the film thickness of the thin aluminum film is less than 30 nm, the film thickness of the uneven structure layer is less than 270 nm. As shown in FIG. 7, in the example, the film thickness of the uneven structure layer is about 140 nm when the film thickness of the thin aluminum film is 10 nm, the film thickness of the uneven structure layer is about 200 nm when the film thickness of the thin aluminum film is 15 nm, and film thickness of the uneven structure layer is about 230 nm when the film thickness of the thin aluminum film is 20 nm. In the subsequent examples, only the film thickness of the thin aluminum film as the precursor is described but the thickness of the uneven structure layer after a hot water treatment under the same hot water treatment conditions can be estimated based on the graph shown in FIG. 7. In FIG. 7, the thickness of the uneven structure layer includes an error of about ±10 nm.

Figure 8:
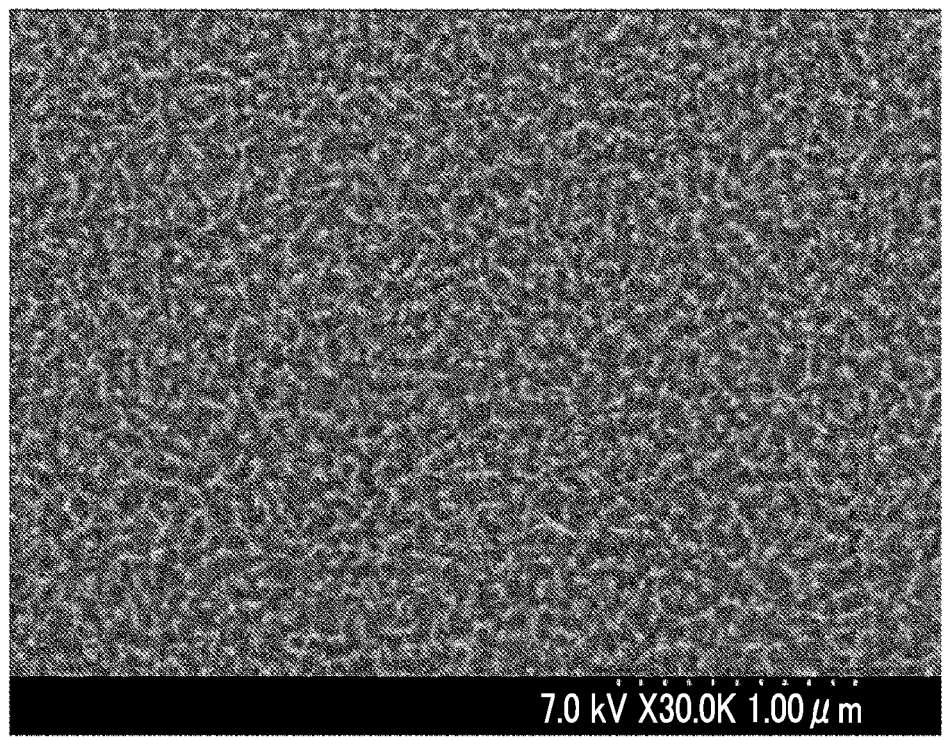
FIG. 8 is an electron microscope image obtained by photographing the surface of an uneven structure layer of Example 2.

FIG. 8 shows an electron microscope image obtained by photographing the surface of the uneven structure layer of the antireflection film prepared in Example 2. As shown in FIG. 8, the uneven structure made of an alumina hydrate is observed as a structure in which a large number of ridgelines formed by bonding a fine petal structure thereto are randomly formed in all directions from the top surface. The same structure was observed in Examples 1 and 3 and Comparative Examples 1 to 3.

The electron microscope images of Examples 1 to 3 and Comparative Examples 1 and 2 were photographed to obtain respective spatial frequency spectra and then the spatial frequency value having the maximum intensity was obtained as a spatial frequency peak value. Specifically, the microscopic image (magnification of 30,000 times, accelerating voltage of 7.0 kV) photographed with a scanning electron microscope S-4100 (manufactured by Hitachi, Ltd.) was cut into a 600×400 pixel image and two-dimensional Fourier transformation was carried out using image processing software Igor. The square intensity spectrum of the obtained two-dimensional spatial frequency was integrated into an azimuth direction and the intensity of the spectrum corresponding to the magnitude of the spatial frequency was obtained to calculate a relationship between the one-dimensional spatial frequency and the spectrum intensity. Then, using image processing software Igor, the vicinity of the apex was fitted with the Lorenz function to obtain the spatial frequency value having the maximum intensity as the spatial frequency peak value.

Figure 9:
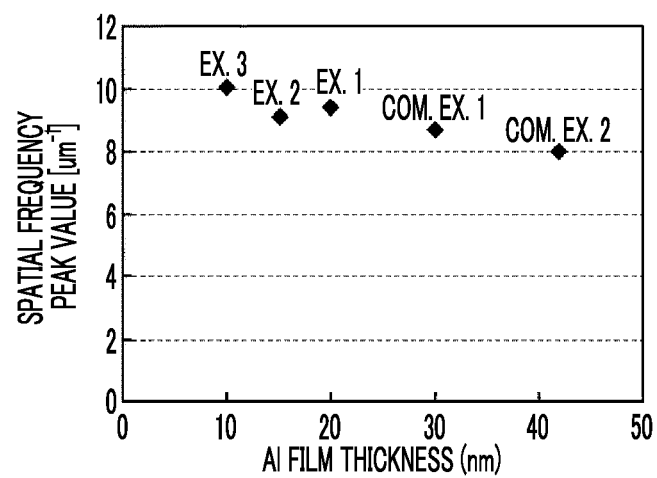
FIG. 9 is a view showing a relationship between the film thickness of a thin aluminum film and a spatial frequency peak value.

FIG. 9 is a view showing a relationship between the film thickness of the thin aluminum film at the time of film formation and the spatial frequency peak value of the uneven structure obtained after the hot water treatment in Examples 1 to 3 and Comparative Examples 1 and 2. As shown in FIG. 9, it was found that in each fine uneven structure obtained by the methods in Examples and Comparative Examples, a relatively high spatial frequency peak value of 8.0 $\mu m^{-1}$ was obtained but in Examples 1 to 3 in which a high effect of suppressing the amount of scattered light was exhibited, a value substantially greater than 8.5 was obtained. It is more preferable that the spatial frequency peak value is 9.0 $\mu m^{-1}$ or greater.

Comparative Example 4

An optical member including an antireflection film of Comparative Example 4 was prepared in the same procedures as in the production method of Example 1 except that a concave lens (curvature radius: 17 mm) made of S-LAH55V (manufactured by Ohara Inc., refractive index: 1.840) was used as the substrate and six layers of silicon oxynitride (refractive index: 1.511) and niobium oxide (refractive index: 2.351) were sequentially laminated. The layer constitution formed on the substrate is as shown in Table 4 below and the antireflection film of Comparative Example 4 does not include an uneven structure layer.

TABLE 4

| Comparative Example 4 | Material | Refractive index | Film thickness (nm) |
| --- | --- | --- | --- |
| First layer | SiON | 1.511 | 86 |
| Second layer | $Nb_2O_5$ | 2.361 | 34 |
| Third layer | SiON | 1.511 | 5 |
| Fourth layer | $Nb_2O_5$ | 2.361 | 72 |
| Fifth layer | SiON | 1.511 | 18 |
| Sixth layer | $Nb_2O_5$ | 2.361 | 17 |
| Substrate | S-LAH55V | 1.840 | — |

The wavelength dependence of the reflectance of Comparative Example 4 is shown in FIG. 10. As shown in FIG. 10, in the antireflection film of Comparative Example 4, a region in which a reflectance was 0.2% or less in a visible light region was not present and good antireflection performance was not obtained.

Hereinafter, optical members including the antireflection film of the present invention were prepared for Examples 4 to 13.

Example 4

An optical member including an antireflection film of Example 4 was prepared in the same procedures as in the production method of Example 1 except that a concave lens (curvature radius: 17 mm) made of FDS90 (manufactured by HOYA Corporation, refractive index: 1.857) was used as the substrate and the film thickness of the thin aluminum film was set to 20 nm. The intermediate layer was formed to have a four-layer structure formed by laminating odd-numbered layers of first and third layers, made of silicon oxynitride, and even-numbered layers of second and fourth layers, made of niobium oxide. The layer constitution from the substrate to the thin aluminum film is as shown in Table 5 below.

TABLE 5

| Example 4 | Material | Refractive index | Film thickness (nm) |
| --- | --- | --- | --- |
| Precursor | Al | | 20 |
| First layer | SiON | 1.511 | 8 |
| Second layer | $Nb_2O_5$ | 2.361 | 9 |
| Third layer | SiON | 1.511 | 51 |
| Fourth layer | $Nb_2O_5$ | 2.361 | 6 |
| Substrate | FDS90 | 1.857 | — |

The wavelength dependence of the reflectance of Example 4 is shown in FIG. 11. As shown in FIG. 11, the antireflection film of Example 4 exhibited a reflectance of 0.1% or less in a visible light region of a wavelength of 430 to 750 nm and good antireflection properties were obtained.

Example 5

An optical member including an antireflection film of Example 5 was prepared in the same procedures as in the production method of Example 1 except that a concave lens (curvature radius: 17 mm) made of FDS90 (manufactured by HOYA Corporation, refractive index: 1.857) was used as the substrate and the film thickness of the thin aluminum film was set to 20 nm. The intermediate layer was formed to have a five-layer structure formed by laminating odd-numbered layers of first, third, and fifth layers, made of silicon oxynitride, and even-numbered layers of second and fourth layers, made of titanium oxide ($TiO_2$, refractive index: 2.659). The layer constitution from the substrate to the thin aluminum film is as shown in Table 6 below.

TABLE 6

| Example 5 | Material | Refractive index | Film thickness (nm) |
| --- | --- | --- | --- |
| Precursor | Al | | 20 |
| First layer | SiON | 1.511 | 8 |
| Second layer | $TiO_2$ | 2.659 | 5 |
| Third layer | SiON | 1.511 | 55 |
| Fourth layer | $TiO_2$ | 2.659 | 5 |
| Fifth layer | SiON | 1.511 | 12 |
| Substrate | FDS90 | 1.857 | — |

The wavelength dependence of the reflectance of Example 5 is shown in FIG. 12. As shown in FIG. 12, the antireflection film of Example 5 exhibited a reflectance of 0.1% or less in a wide range including a visible light region of a wavelength of 430 to 800 nm and good antireflection properties were obtained.

Example 6

An optical member including an antireflection film of Example 6 was prepared in the same procedures as in the production method of Example 1 except that a concave lens (curvature radius: 17 mm) made of S-TIH6 (manufactured by Ohara Inc., refractive index: 1.814) was used as the substrate and the film thickness of the thin aluminum film was set to 15 nm. The intermediate layer was formed to have a seven-layer structure formed by laminating odd-numbered layers of first, third, fifth and seventh layers, made of silicon oxynitride, and even-numbered layers of second, fourth and sixth layers, made of niobium oxide. The layer constitution from the substrate to the thin aluminum film is as shown in Table 7 below.

TABLE 7

| Example 6 | Material | Refractive index | Film thickness (nm) |
|---|---|---|---|
| Precursor | Al | | 15 |
| First layer | SiON | 1.511 | 77 |
| Second layer | Nb$_2$O$_5$ | 2.361 | 5 |
| Third layer | SiON | 1.511 | 21 |
| Fourth layer | Nb$_2$O$_5$ | 2.361 | 5 |
| Fifth layer | SiON | 1.511 | 22 |
| Sixth layer | Nb$_2$O$_5$ | 2.361 | 7 |
| Seventh layer | SiON | 1.511 | 5 |
| Substrate | S-TIH6 | 1.814 | — |

The wavelength dependence of the reflectance of Example 6 is shown in FIG. 13. As shown in FIG. 13, the antireflection film of Example 6 exhibited a reflectance of 0.1% or less in a wide range including a visible light region of a wavelength of 430 to 800 nm and good antireflection properties were obtained.

Example 7

An optical member including an antireflection film of Example 7 was prepared in the same procedures as in the production method of Example 1 except that a concave lens (curvature radius: 17 mm) made of S-LAH58 (manufactured by Ohara Inc., refractive index: 1.889) was used as the substrate and the film thickness of the thin aluminum film was set to 15 nm. The intermediate layer was formed to have an eight-layer structure formed by laminating odd-numbered layers of first, third, fifth and seventh layers, made of silicon oxynitride, and even-numbered layers of second, fourth, sixth and eighth layers, made of niobium oxide. The layer constitution from the substrate to the thin aluminum film is as shown in Table 8 below.

TABLE 8

| Example 7 | Material | Refractive index | Film thickness (nm) |
|---|---|---|---|
| Precursor | Al | | 15 |
| First layer | SiON | 1.511 | 64 |
| Second layer | Nb$_2$O$_5$ | 2.361 | 6 |
| Third layer | SiON | 1.511 | 21 |
| Fourth layer | Nb$_2$O$_5$ | 2.361 | 6 |
| Fifth layer | SiON | 1.511 | 25 |
| Sixth layer | Nb$_2$O$_5$ | 2.361 | 22 |
| Seventh layer | SiON | 1.511 | 27 |
| Eighth layer | Nb$_2$O$_5$ | 2.361 | 12 |
| Substrate | S-LAH58 | 1.889 | — |

The wavelength dependence of the reflectance of Example 7 is shown in FIG. 14. As shown in FIG. 14, the antireflection film of Example 7 exhibited a reflectance of 0.1% or less in a wide range including a visible light region of a wavelength of 430 to 800 nm and good antireflection properties were obtained.

Example 8

An optical member including an antireflection film of Example 8 was prepared in the same procedures as in the production method of Example 1 except that a concave lens (curvature radius: 17 mm) made of S-LAH79 (manufactured by Ohara Inc., refractive index: 2.013) was used as the substrate and the film thickness of the thin aluminum film was set to 10 nm. The intermediate layer was formed to have a nine-layer structure formed by laminating odd-numbered layers of first, third, fifth, seventh and ninth layers, made of silicon oxynitride, and even-numbered layers of second, fourth, sixth and eighth layers, made of niobium oxide. The layer constitution from the substrate to the thin aluminum film is as shown in Table 9 below.

TABLE 9

| Example 8 | Material | Refractive index | Film thickness (nm) |
|---|---|---|---|
| Precursor | Al | | 10 |
| First layer | SiON | 1.511 | 50 |
| Second layer | Nb$_2$O$_5$ | 2.361 | 16 |
| Third layer | SiON | 1.511 | 13 |
| Fourth layer | Nb$_2$O$_5$ | 2.361 | 103 |
| Fifth layer | SiON | 1.511 | 17 |
| Sixth layer | Nb$_2$O$_5$ | 2.361 | 31 |
| Seventh layer | SiON | 1.511 | 32 |
| Eighth layer | Nb$_2$O$_5$ | 2.361 | 24 |
| Ninth layer | SiON | 1.511 | 16 |
| Substrate | S-LAH79 | 2.013 | — |

The wavelength dependence of the reflectance of Example 8 is shown in FIG. 15. As shown in FIG. 15, the antireflection film of Example 8 exhibited a reflectance of 0.1% or less in a visible light region of a wavelength of 400 to 750 nm and good antireflection properties were obtained.

Example 9

An optical member including an antireflection film of Example 9 was prepared in the same procedures as in the production method of Example 1 except that a concave lens (curvature radius: 17 mm) made of S-YGH51 (manufactured by Ohara Inc., refractive index: 1.759) was used as the substrate and the film thickness of the thin aluminum film was set to 10 nm. The intermediate layer was formed to have a ten-layer structure formed by laminating odd-numbered layers of first, third, fifth, seventh and ninth layers, made of silicon oxynitride, and even-numbered layers of second, fourth, sixth, eighth and tenth layers, made of niobium oxide. The layer constitution from the substrate to the thin aluminum film is as shown in Table 10 below.

TABLE 10

| Example 9 | Material | Refractive index | Film thickness (nm) |
|---|---|---|---|
| Precursor | Al | | 10 |
| First layer | SiON | 1.511 | 52 |
| Second layer | Nb$_2$O$_5$ | 2.361 | 18 |
| Third layer | SiON | 1.511 | 12 |
| Fourth layer | Nb$_2$O$_5$ | 2.361 | 94 |
| Fifth layer | SiON | 1.511 | 19 |
| Sixth layer | Nb$_2$O$_5$ | 2.361 | 27 |
| Seventh layer | SiON | 1.511 | 45 |
| Eighth layer | Nb$_2$O$_5$ | 2.361 | 17 |
| Ninth layer | SiON | 1.511 | 42 |
| Tenth layer | Nb$_2$O$_5$ | 2.361 | 6 |
| Substrate | S-YGH51 | 1.759 | — |

Figure 16:
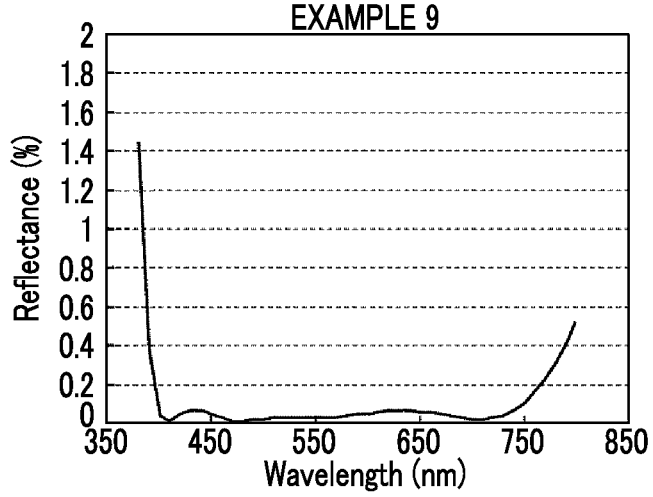
FIG. 16 is a view showing the wavelength dependence of the reflectance of an optical member of Example 9.

The wavelength dependence of the reflectance of Example 9 is shown in FIG. 16. As shown in FIG. 16, the antireflection film of Example 9 exhibited a reflectance of 0.1% or less in a visible light region of a wavelength of 400 to 750 nm and good antireflection properties were obtained.

Example 10

An optical member including an antireflection film of Example 10 was prepared in the same procedures as in the production method of Example 1 except that a concave lens (curvature radius: 17 mm) made of S-LAH55V (manufactured by Ohara Inc., refractive index: 1.840) was used as the substrate and the film thickness of the thin aluminum film was set to 10 nm. The intermediate layer was formed to have a four-layer structure formed by laminating odd-numbered layers of first and third layers, made of silicon oxynitride, and even-numbered layers of second and fourth layers, made of niobium oxide. The layer constitution from the substrate to the thin aluminum film is as shown in Table 11 below.

TABLE 11

| Example 10 | Material | Refractive index | Film thickness (nm) |
|---|---|---|---|
| Precursor | Al | | 10 |
| First layer | SiON | 1.511 | 68 |
| Second layer | $Nb_2O_5$ | 2.361 | 18 |
| Third layer | SiON | 1.511 | 34 |
| Fourth layer | $Nb_2O_5$ | 2.361 | 14 |
| Substrate | S-LAH55V | 1.840 | — |

Figure 17:
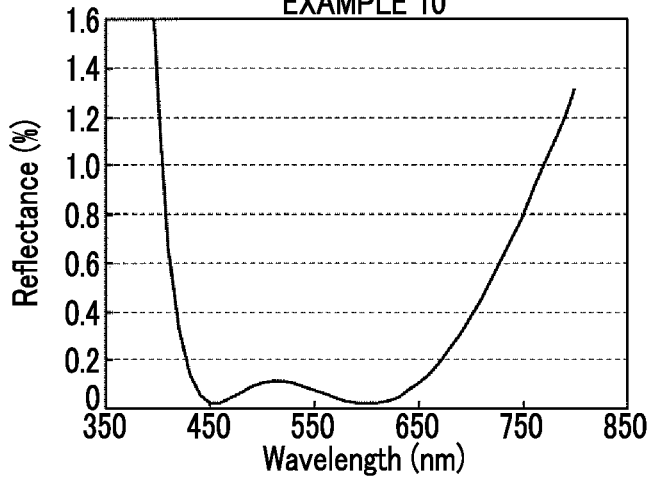
FIG. 17 is a view showing the wavelength dependence of the reflectance of an optical member of Example 10.

The wavelength dependence of the reflectance of Example 10 is shown in FIG. 17. As shown in FIG. 17 the antireflection film of Example 10 exhibited a reflectance of 0.1% or less in a visible light region of a wavelength of 450 to 650 nm and good antireflection properties were obtained.

Example 11

An optical member including an antireflection film of Example 11 was prepared in the same procedures as in the production method of Example 1 except that a concave lens (curvature radius: 17 mm) made of S-LAH55V (manufactured by Ohara Inc., refractive index: 1.840) was used as the substrate and the film thickness of the thin aluminum film was set to 10 nm. The intermediate layer was formed to have a five-layer structure formed by laminating odd-numbered layers of first, third and fifth layers, made of silicon oxynitride, and even-numbered layers of second and fourth layers, made of niobium oxide. The layer constitution from the substrate to the thin aluminum film is as shown in Table 12 below.

TABLE 12

| Example 11 | Material | Refractive index | Film thickness (nm) |
|---|---|---|---|
| Precursor | Al | | 10 |
| First layer | SiON | 1.511 | 71 |
| Second layer | $Nb_2O_5$ | 2.361 | 23 |
| Third layer | SiON | 1.511 | 35 |
| Fourth layer | $Nb_2O_5$ | 2.361 | 21 |
| Fifth layer | SiON | 1.511 | 6 |
| Substrate | S-LAH55V | 1.840 | — |

Figure 18:
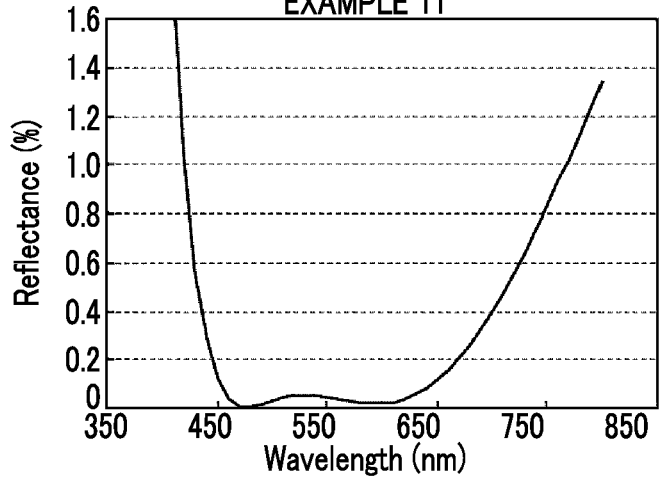
FIG. 18 is a view showing the wavelength dependence of the reflectance of an optical member of Example 11.

The wavelength dependence of the reflectance of Example 11 is shown in FIG. 18. As shown in FIG. 18, the antireflection film of Example 11 exhibited a reflectance of 0.1% or less in a visible light region of a wavelength of 450 to 650 nm and good antireflection properties were obtained.

Example 12

An optical member including an antireflection film of Example 12 was prepared in the same procedures as in the production method of Example 1 except that a concave lens (curvature radius: 17 mm) made of S-LAH55V (manufactured by Ohara Inc., refractive index: 1.840) was used as the substrate and the film thickness of the thin aluminum film was set to 15 nm. The intermediate layer was formed to have a four-layer structure formed by laminating odd-numbered layers of first and third layers, made of silicon oxynitride, and even-numbered layers of second and fourth layers, made of niobium oxide. The layer constitution from the substrate to the thin aluminum film is as shown in Table 13 below.

TABLE 13

| Example 12 | Material | Refractive index | Film thickness (nm) |
|---|---|---|---|
| Precursor | Al | | 15 |
| First layer | SiON | 1.511 | 70 |
| Second layer | $Nb_2O_5$ | 2.361 | 6 |
| Third layer | SiON | 1.511 | 32 |
| Fourth layer | $Nb_2O_5$ | 2.361 | 5 |
| Substrate | S-LAH55V | 1.840 | — |

Figure 19:
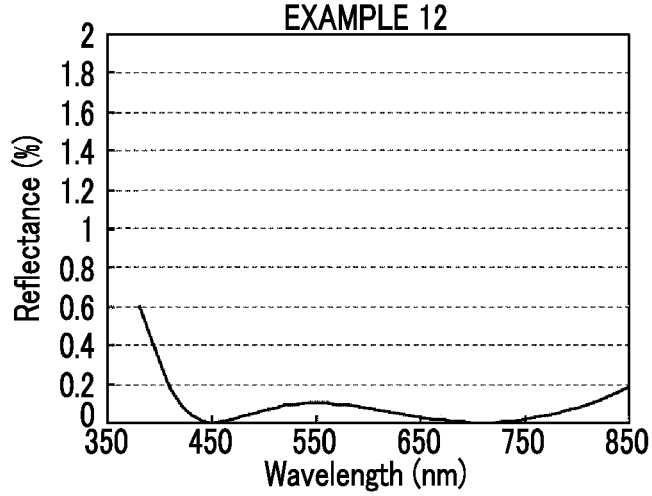
FIG. 19 is a view showing the wavelength dependence of the reflectance of an optical member of Example 12.

The wavelength dependence of the reflectance of Example 12 is shown in FIG. 19. As shown in FIG. 19, the antireflection film of Example 12 exhibited a reflectance of 0.1% or less in a wide range including a visible light region of a wavelength of 430 to 800 nm and good antireflection properties were obtained.

Example 13

An optical member including an antireflection film of Example 13 was prepared in the same procedures as in the production method of Example 1 except that a concave lens (curvature radius: 17 mm) made of S-LAH55V (manufactured by Ohara Inc., refractive index: 1.840) was used as the substrate and the film thickness of the thin aluminum film was set to 15 nm. The intermediate layer was formed to have a five-layer structure formed by laminating odd-numbered layers of first, third and fifth layers, made of silicon oxynitride, and even-numbered layers of second and fourth layers, made of niobium oxide. The layer constitution from the substrate to the thin aluminum film is as shown in Table 14 below.

TABLE 14

| Example 13 | Material | Refractive index | Film thickness (nm) |
|---|---|---|---|
| Precursor | Al | | 15 |
| First layer | SiON | 1.511 | 67 |
| Second layer | $Nb_2O_5$ | 2.361 | 6 |
| Third layer | SiON | 1.511 | 40 |
| Fourth layer | $Nb_2O_5$ | 2.361 | 12 |
| Fifth layer | SiON | 1.511 | 14 |
| Substrate | S-LAH55V | 1.840 | — |

Figure 20:
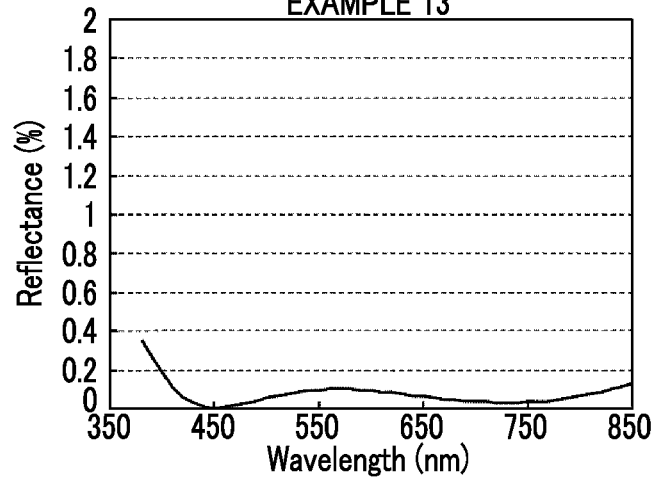
FIG. 20 is a view showing the wavelength dependence of the reflectance of an optical member of Example 13.

The wavelength dependence of the reflectance of Example 13 is shown in FIG. 20. As shown in FIG. 20, the antireflection film of Example 13 exhibited a reflectance of 0.1% or less in a wide range including a visible light region of a wavelength of 430 to 800 nm and good antireflection properties were obtained.

In the above examples, as shown in Examples 1, 2, 4, 5, 6, 7, 12 and 13, it is preferable that the film thickness of the high refractive index layers of at least the second and fourth layers is 5 nm to 15 nm, which was very thin, and the film thickness of the low refractive index layer of the first or third layer is 50 nm to 80 nm. In these examples, for a wavelength bandwidth in which the reflectance is 0.1% or less, a wavelength bandwidth of substantially 350 nm or more can be obtained. Particularly, in the case in which the antireflection film had a six-layer constitution and was provided with a low refractive index layer having a film thickness of more than 70 nm for the first or third layer in Example 1 or 2, a wavelength bandwidth of 400 nm was obtained as a wavelength bandwidth in which the reflectance is 0.1% or less. A layer constitution of six or more layers tended to easily achieve a reflectance of 0.1% or less in a wide wavelength bandwidth. In addition, no matter how many layers were laminated, the film thickness of the layer the closest to the substrate side was suitably in a relatively thin range of 20 nm or less.

Hereinafter, numerical value examples (Examples 14 to 43) of antireflection films obtained by changing the layer constitution will be described.

Example 14 to Example 18

In Example 14 to 18, concave lenses (curvature radius: 17 mm) respectively made of materials having refractive indices shown in Table 15 below were used as the substrates and the film thickness of the thin aluminum film as the precursor of the uneven structure layer was set to 16 nm. The intermediate layer in each example was formed to have an eight-layer structure formed by laminating odd-numbered layers of first, third, fifth and seventh layers, made of silicon oxynitride, and even-numbered layers of second, fourth, sixth and eighth layers, made of niobium oxide. The layer constitution from the substrate to the thin aluminum film in each example is as shown in Table 15 below.

Figure 51:
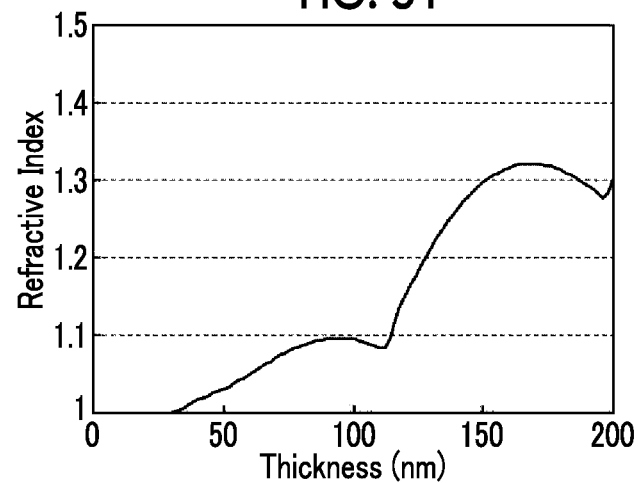
FIG. 51 is a refractive index distribution of an uneven structure layer prepared using a thin aluminum film having a film thickness of 16 nm.

The wavelength dependence of the reflectance of each of Example 14 to 18 obtained by using thin film calculation software "Essential Macleod (produced by SIGMAKOKI CO., LTD.)" is shown in FIGS. 21 to 25. When the wavelength dependence of the reflectance was obtained, for the refractive index of a boehmite layer obtained by forming an aluminum film having a film thickness of 16 nm and then treating the film with hot water, a refractive index distribution in a depth direction shown in FIG. 51 derived by actually carrying out spectral ellipsometry measurement and reflectance measurement on the uneven structure layer formed of an aluminum hydroxide layer formed when the thin aluminum film having a film thickness of 16 nm was formed on the Si substrate and then the film was treated with hot water as in Example 1 was used. In FIG. 51, a position at a thickness of 200 nm corresponds to the position of the interface between the uneven structure layer and the intermediate layer. As shown in FIG. 51, the refractive index of the uneven structure layer becomes closer to the refractive index of air n=1 at the surface side and is equal to the refractive index of air at the outermost surface. In FIG. 51, a distance from a position of the interface of the intermediate layer to a position at which the refractive index decreases gradually and reaches the refractive index n=1 is different from the film thickness of the fine uneven structure film estimated from FIG. 7. This is because since the volume with respect to the wavelength of light is very small in the vicinity of the apex (outermost surface) of the fine uneven structure, the refractive index is almost 1. In FIG. 51, when the region in which the refractive index is 1 is observed through a SEM image, the protrusion distal end partially remains. Accordingly, the distance from the interface of the intermediate layer to the position at which the refractive index is 1 in the refractive index distribution derived by the spectral ellipsometry measurement and reflectance measurement is smaller than the film thickness of the uneven structure obtained from the SEM image. The same will be applied to the refractive index distributions shown in FIGS. 52 and 53.

TABLE 15

| Layer constitution | Material | Example 14 Film thickness (nm) | Example 15 Film thickness (nm) | Example 16 Film thickness (nm) | Example 17 Film thickness (nm) | Example 18 Film thickness (nm) |
| --- | --- | --- | --- | --- | --- | --- |
| Precursor | Al | 16 | 16 | 16 | 16 | 16 |
| First layer | SiON | 50 | 52 | 52 | 54 | 56 |
| Second layer | $Nb_2O_5$ | 15 | 15 | 16 | 16 | 17 |
| Third layer | SiON | 21 | 21 | 21 | 21 | 21 |
| Fourth layer | $Nb_2O_5$ | 120 | 124 | 125 | 129 | 135 |
| Fifth layer | SiON | 19 | 16 | 16 | 14 | 11 |
| Sixth layer | $Nb_2O_5$ | 26 | 29 | 30 | 33 | 37 |
| Seventh layer | SiON | 38 | 30 | 28 | 24 | 17 |
| Eighth layer | $Nb_2O_5$ | 10 | 12 | 12 | 14 | 16 |
| Substrate | Refractive index | 1.659 | 1.777 | 1.812 | 1.889 | 2.013 |

Here, it is assumed that as the substrate, a substrate made of S-NBH5 (manufactured by Ohara Inc., refractive index: 1.659) was used in Example 14, a substrate made of S-LAH66 (manufactured by Ohara Inc., refractive index: 1.777) was used in Example 15, a substrate made of S-LAH53 (manufactured by Ohara Inc., refractive index: 1.812) was used in Example 16, a substrate made of S-LAH58 (manufactured by Ohara Inc., refractive index: 1.889) was used in Example 17, and a substrate made of S-LAH79 (manufactured by Ohara Inc., refractive index: 2.013) was used in Example 18, respectively.

Figure 21:
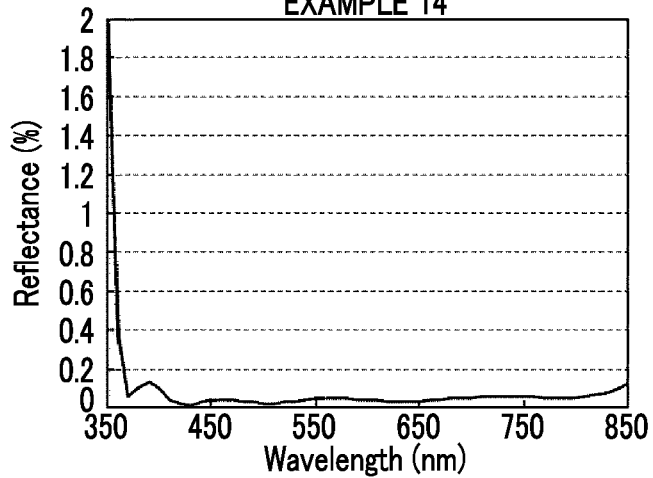
FIG. 21 is a view showing the wavelength dependence of the reflectance of an optical member of Example 14.

The wavelength dependence of the reflectance of Example 14 is shown in FIG. 21. As shown in FIG. 21, the antireflection film of Example 14 exhibited a reflectance of 0.1% or less in a wide range including a visible light region of a wavelength of 400 to 840 nm and good antireflection properties were obtained.

Figure 22:
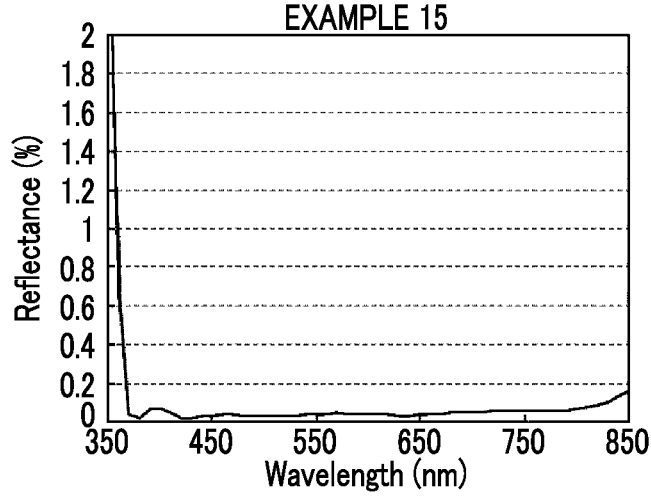
FIG. 22 is a view showing the wavelength dependence of the reflectance of an optical member of Example 15.

The wavelength dependence of the reflectance of Example 15 is shown in FIG. 22. As shown in FIG. 22, the antireflection film of Example 15 exhibited a reflectance of 0.1% or less in a wide range including a visible light region of a wavelength of 370 to 830 nm and good antireflection properties were obtained.

Figure 23:
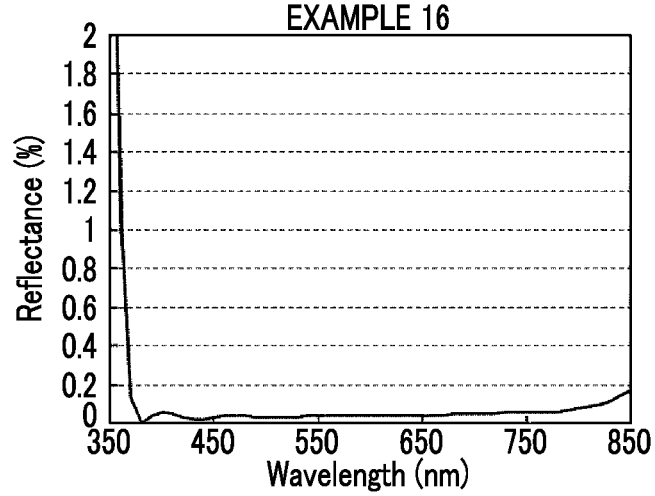
FIG. 23 is a view showing the wavelength dependence of the reflectance of an optical member of Example 16.

The wavelength dependence of the reflectance of Example 16 is shown in FIG. 23. As shown in FIG. 23, the antireflection film of Example 16 exhibited a reflectance of 0.1% or less in a wide range including a visible light region of a wavelength of 370 to 830 nm and good antireflection properties were obtained.

Figure 24:
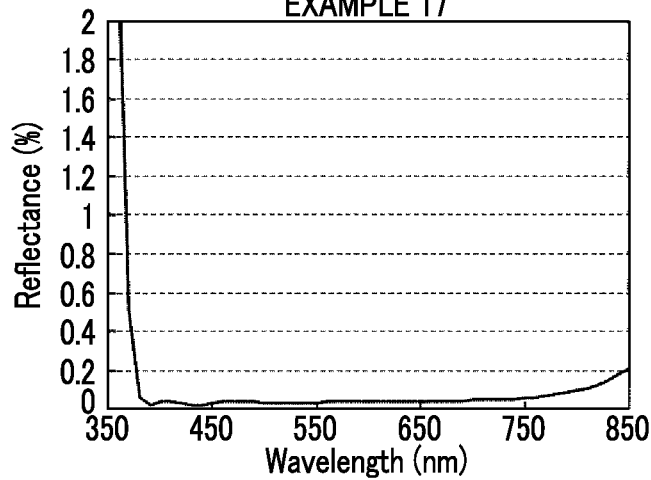
FIG. 24 is a view showing the wavelength dependence of the reflectance of an optical member of Example 17.

The wavelength dependence of the reflectance of Example 17 is shown in FIG. 24. As shown in FIG. 24, the antireflection film of Example 17 exhibited a reflectance of 0.1% or less in a wide range including a visible light region of a wavelength of 380 to 800 nm and good antireflection properties were obtained.

Figure 25:
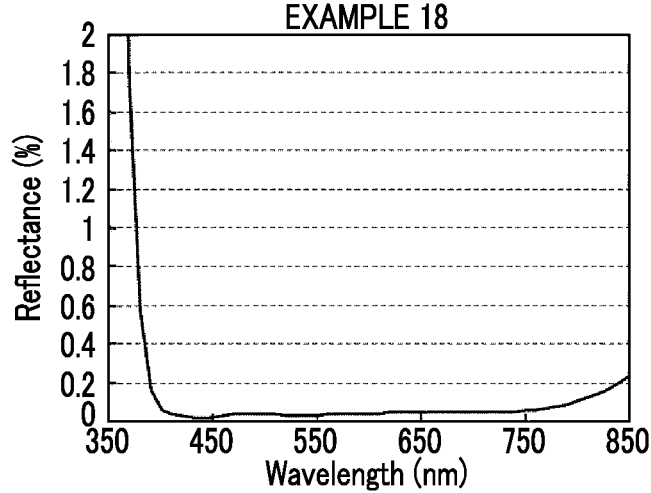
FIG. 25 is a view showing the wavelength dependence of the reflectance of an optical member of Example 18.

The wavelength dependence of the reflectance of Example 18 is shown in FIG. 25. As shown in FIG. 25, the antireflection film of Example 18 exhibited a reflectance of 0.1% or less in a wide range including a visible light region of a wavelength of 400 to 800 nm and good antireflection properties were obtained.

As described above, in any of the antireflection films having an eight-layer structure of Examples 14 to 18, a very wide wavelength bandwidth of 400 nm or more in which the reflectance is 0.1% or less is obtained. In Examples 14 to 18, the film thickness of the thin aluminum film as the precursor is 16 nm and the film thickness of the uneven structure layer is 210 nm when referring to FIG. 7. As shown in Examples 14 to 18, when the intermediate layer was constituted such that the film thickness of the first layer was in a range of 50 to 56 nm, the film thickness of the second layer was in a range of 15 to 17 nm, the film thickness of the third layer was 21 nm, the film thickness of the fourth layer was in a range of 120 to 135 nm, the film thickness of the fifth layer was in a range of 11 to 19 nm, the film thickness of the sixth layer was in a range of 26 to 37 nm, the film thickness of the seventh layer was in a range of 17 to 38 nm, and the film thickness of the eighth layer was in a range of 10 to 16 nm, respectively, very preferable antireflection performance could be obtained. Particularly, in the case in which the antireflection film was provided on the substrate having a refractive index of 1.65 to 1.82, the wavelength bandwidth in which the reflectance is 0.1% or less was 440 nm or more, which was most suitable.

Example 19 to Example 23

In Examples 19 to 23, concave lenses (curvature radius: 17 mm) respectively made of the materials having refractive indices shown in Table 16 below were used as the substrates and the film thickness of the thin aluminum film as the precursor of the uneven structure layer was set to 20 nm. The intermediate layer was formed to have an eight-layer structure formed by laminating odd-numbered layers of first, third, fifth and seventh layers, made of silicon oxynitride, and even-numbered layers of second, fourth, sixth and eighth layers, made of niobium oxide. The layer constitution from the substrate to the thin aluminum layer in each example is as shown in Table 16 below.

Figure 52:
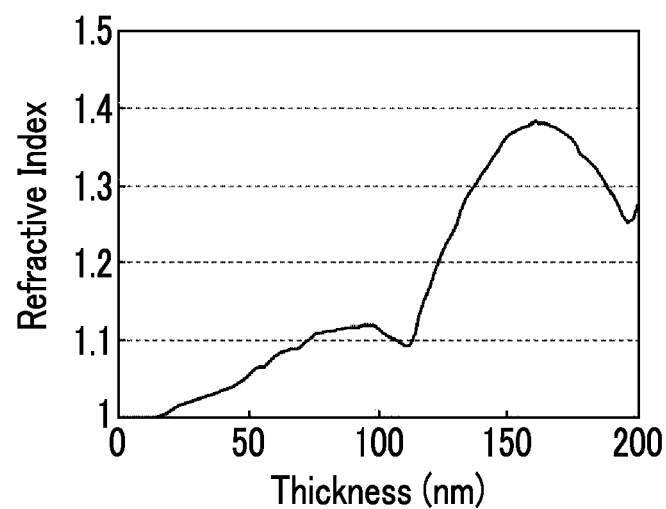
FIG. 52 is a view showing a refractive index distribution of an uneven structure layer prepared using a thin aluminum film having a film thickness of 20 nm.

The wavelength dependence of the reflectance of each of Examples 19 to 23 obtained in the same manner as in Examples 14 to 18 is shown in FIGS. 26 to 30. When the wavelength dependence of the reflectance was obtained, for the refractive index of a boehmite layer obtained by forming an aluminum film having a film thickness of 20 nm and then treating the film with hot water, a refractive index distribution in a depth direction shown in FIG. 52 derived by carrying out spectral ellipsometry measurement and reflectance measurement on the uneven structure layer formed of an aluminum hydroxide layer formed when the thin aluminum film having a film thickness of 20 nm was formed on the Si substrate and then the film was treated with hot water as in Example 1 was used. In FIG. 52, similar to FIG. 51, a thickness direction position in which the refractive index is n=1 is disposed on the side of the uneven structure layer closest to the air (outermost surface) and a position at a thickness of 200 nm corresponds to the position of the interface with the intermediate layer.

TABLE 16

| Layer constitution | Material | Example 19 Film thickness (nm) | Example 20 Film thickness (nm) | Example 21 Film thickness (nm) | Example 22 Film thickness (nm) | Example 23 Film thickness (nm) |
|---|---|---|---|---|---|---|
| Precursor | Al | 20 | 20 | 20 | 20 | 20 |
| First layer | SiON | 42 | 42 | 42 | 44 | 46 |
| Second layer | $Nb_2O_5$ | 15 | 15 | 15 | 15 | 16 |
| Third layer | SiON | 24 | 24 | 24 | 24 | 23 |
| Fourth layer | $Nb_2O_5$ | 123 | 124 | 125 | 127 | 129 |
| Fifth layer | SiON | 20 | 18 | 17 | 15 | 12 |
| Sixth layer | $Nb_2O_5$ | 24 | 28 | 29 | 32 | 36 |
| Seventh layer | SiON | 37 | 30 | 28 | 24 | 18 |
| Eighth layer | $Nb_2O_5$ | 8 | 10 | 11 | 13 | 16 |
| Substrate | Refractive index | 1.659 | 1.777 | 1.812 | 1.889 | 2.013 |

Here, it is assumed that as the substrate, a substrate made of S-NBH5 (manufactured by Ohara Inc., refractive index: 1.659) was used in Example 19, a substrate made of S-LAH66 (manufactured by Ohara Inc., refractive index: 1.777) was used in Example 20, a substrate made of S-LAH53 (manufactured by Ohara Inc., refractive index: 1.812) was used in Example 21, a substrate made of S-LAH58 (manufactured by Ohara Inc., refractive index: 1.889) was used in Example 22, and a substrate made of S-LAH79 (manufactured by Ohara Inc., refractive index: 2.013) was used in Example 23, respectively.

Figure 26:
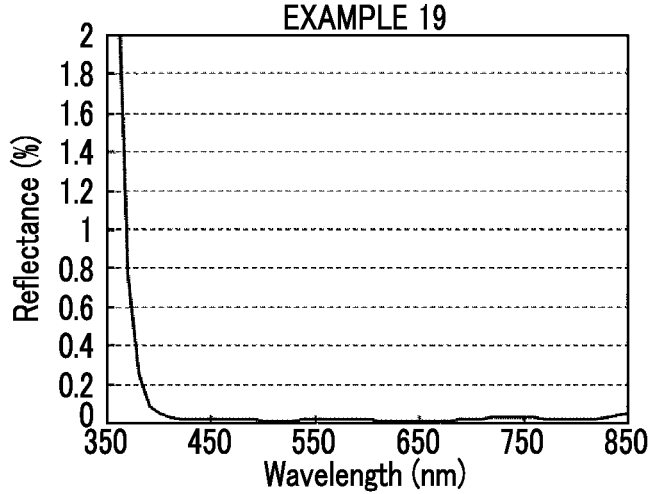
FIG. 26 is a view showing the wavelength dependence of the reflectance of an optical member of Example 19.

The wavelength dependence of the reflectance of Example 19 is shown in FIG. 26. As shown in FIG. 26, the antireflection film of Example 19 exhibited a reflectance of 0.1 or less in a wide range including a visible light region of a wavelength of 390 to more than 850 nm and good antireflection properties were obtained.

Figure 27:
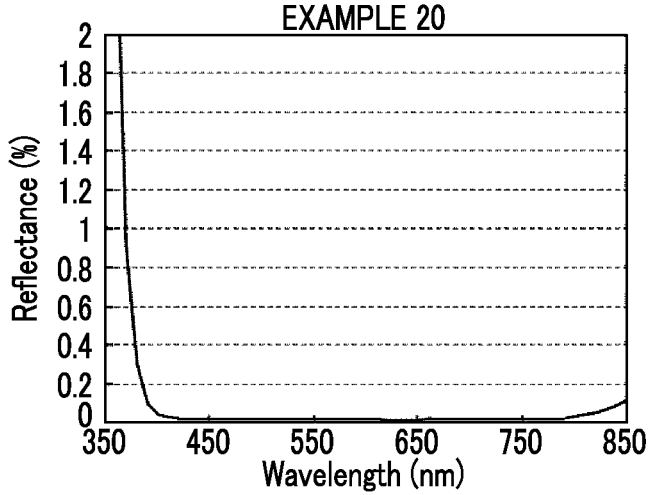
FIG. 27 is a view showing the wavelength dependence of the reflectance of an optical member of Example 20.

The wavelength dependence of the reflectance of Example 20 is shown in FIG. 27. As shown in FIG. 27, the antireflection film of Example 20 exhibited a reflectance of 0.1 or less in a wide range including a visible light region of a wavelength of 390 to 840 nm and good antireflection properties were obtained.

The wavelength dependence of the reflectance of Example 21 is shown in FIG. 28. As shown in FIG. 28, the antireflection film of Example 21 exhibited a reflectance of 0.1 or less in a wide range including a visible light region of a wavelength of 390 to 840 nm and good antireflection properties were obtained.

The wavelength dependence of the reflectance of Example 22 is shown in FIG. 29. As shown in FIG. 29, the antireflection film of Example 22 exhibited a reflectance of 0.1 or less in a wide range including a visible light region of a wavelength of 390 to 820 nm and good antireflection properties were obtained.

The wavelength dependence of the reflectance of Example 23 is shown in FIG. 30. As shown in FIG. 30, the antireflection film of the Example 23 exhibited a reflectance of 0.1 or less in a wide range including a visible light region of a wavelength of 390 to 810 nm and good antireflection properties were obtained.

As described above, in any of the antireflection films of Examples 19 to 23 having an eight-layer structure, a very wide wavelength bandwidth of 420 nm or more in which the reflectance is 0.1% or less is obtained. In Examples 19 to 23, the film thickness of the thin aluminum film as the precursor is 20 nm and the film thickness of the uneven structure layer is 230 nm when referring to FIG. 7. As shown in Examples 19 to 23, when the intermediate layer was constituted such that the film thickness of the first layer was in a range of 42 to 46 nm, the film thickness of the second layer was in a range of 15 to 16 nm, the film thickness of the third layer was in a range of 23 to 24 nm, the film thickness of the fourth layer was in a range of 123 to 129 nm, the film thickness of the fifth layer was in a range of 12 to 20 nm, the film thickness of the sixth layer was in a range of 24 to 36 nm, the film thickness of the seventh layer was in a range of 18 to 37 nm, and the film thickness of the eighth layer was in a range of 8 to 16 nm, respectively, very preferable antireflection performance could be obtained. Particularly, in the case in which the antireflection film was provided on the substrate having a refractive index of 1.65 to 1.82, the wavelength bandwidth in which the reflectance is 0.1% or less was 450 nm or more, which was most suitable.

Example 24 to Example 28

In Examples 24 to 28, concave lenses (curvature radius: 17 mm) respectively made of the materials having refractive indices shown in Table 17 below were used as the substrates and the film thickness of the thin aluminum film as the precursor of the uneven structure layer was set to 10 nm. The intermediate layer was formed to have an eight-layer structure formed by laminating odd-numbered layers of first, third, fifth and seventh layers, made of silicon oxynitride, and even-numbered layers of second, fourth, sixth and eighth layers, made of niobium oxide. The layer constitution from the substrate to the thin aluminum layer in each example is as shown in Table 17 below.

Figure 53:
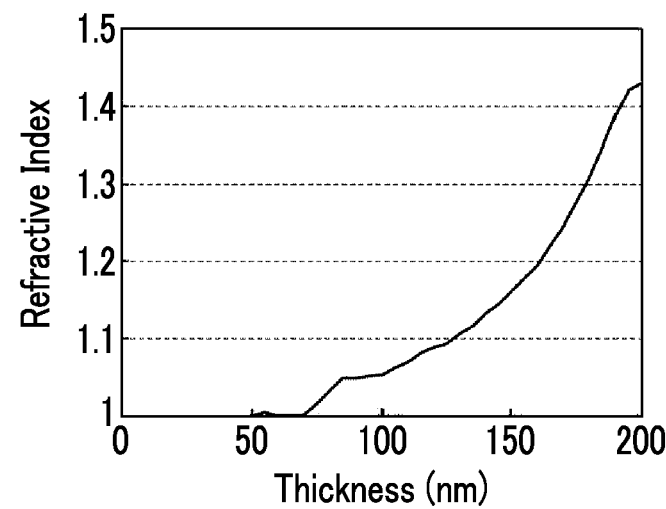
FIG. 53 is a view showing a refractive index distribution of an uneven structure layer prepared using a thin aluminum film having a film thickness of 10 nm.

The wavelength dependence of the reflectance of each of Examples 24 to 28 obtained in the same manner as in Examples 14 to 18 is shown in FIGS. 31 to 35. When the wavelength dependence of the reflectance was obtained, for the refractive index of a boehmite layer obtained by forming an aluminum film having a film thickness of 10 nm and then treating the film with hot water, a refractive index distribution in a depth direction shown in FIG. 53 derived by carrying out spectral ellipsometry measurement and reflectance measurement on the uneven structure layer formed of an aluminum hydroxide layer formed when the thin aluminum film having a film thickness of 10 nm was formed on the Si substrate and then the film was treated with hot water as in Example 1 was used. In FIG. 53, similar to FIG. 51, a thickness direction position in which the refractive index is n=1 is disposed on the side of the uneven structure layer closest to the air (outermost surface) and a position at a thickness of 200 nm corresponds to the position of the interface with the intermediate layer.

TABLE 17

| Layer constitution | Material | Example 24 Film thickness (nm) | Example 25 Film thickness (nm) | Example 26 Film thickness (nm) | Example 27 Film thickness (nm) | Example 28 Film thickness (nm) |
|---|---|---|---|---|---|---|
| Precursor | Al | 10 | 10 | 10 | 10 | 10 |
| First layer | SiON | 54 | 55 | 55 | 55 | 56 |
| Second layer | $Nb_2O_5$ | 20 | 20 | 20 | 20 | 20 |
| Third layer | SiON | 14 | 14 | 14 | 15 | 15 |
| Fourth layer | $Nb_2O_5$ | 84 | 86 | 86 | 89 | 92 |
| Fifth layer | SiON | 16 | 13 | 12 | 10 | 7 |
| Sixth layer | $Nb_2O_5$ | 27 | 30 | 31 | 32 | 34 |
| Seventh layer | SiON | 37 | 29 | 27 | 22 | 16 |
| Eight layer | $Nb_2O_5$ | 9 | 12 | 12 | 13 | 15 |
| Substrate | Refractive index | 1.659 | 1.777 | 1.812 | 1.889 | 2.013 |

Here, it is assumed that as the substrates, a substrate of S-NBH5 (manufactured by Ohara Inc., refractive index: 1.659) is used in Example 24, a substrate of S-LAH66 (manufactured by Ohara Inc., refractive index: 1.777) is used in Example 25, a substrate of S-LAH53 (manufactured by Ohara Inc., refractive index: 1.812) is used in Example 26, a substrate of S-LAH58 (manufactured by Ohara Inc., refractive index: 1.889) is used in Example 27, and a substrate of S-LAH79 (manufactured by Ohara Inc., refractive index: 2.013) is used in Example 28, respectively.

Figure 31:
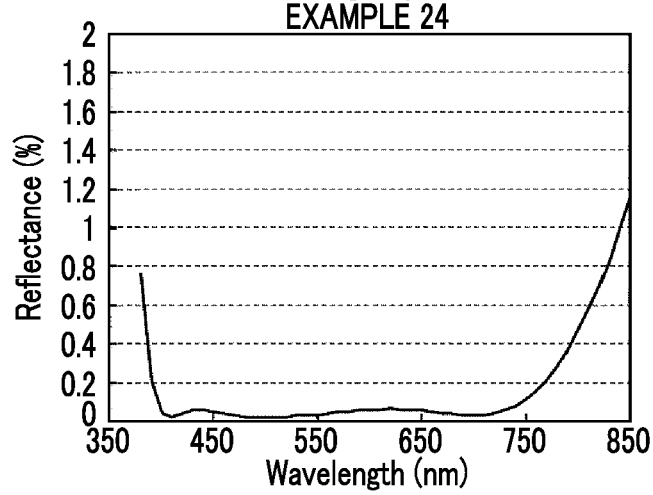
FIG. 31 is a view showing the wavelength dependence of the reflectance of an optical member of Example 24.

The wavelength dependence of the reflectance of Example 24 is shown in FIG. 31. As shown in FIG. 31, the antireflection film of Example 24 exhibited a reflectance of 0.1 or less in a wide range including a visible light region of a wavelength of 390 to more than 750 nm and good antireflection properties were obtained.

Figure 32:
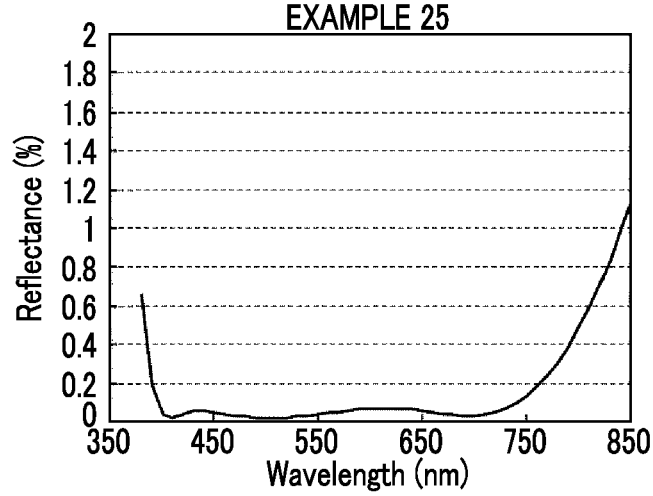
FIG. 32 is a view showing the wavelength dependence of the reflectance of an optical member of Example 25.

The wavelength dependence of the reflectance of Example 25 is shown in FIG. 32. As shown in FIG. 32, the antireflection film of Example 25 exhibited a reflectance of 0.1 or less in a wide range including a visible light region of a wavelength of 400 to 740 nm and good antireflection properties were obtained.

Figure 33:
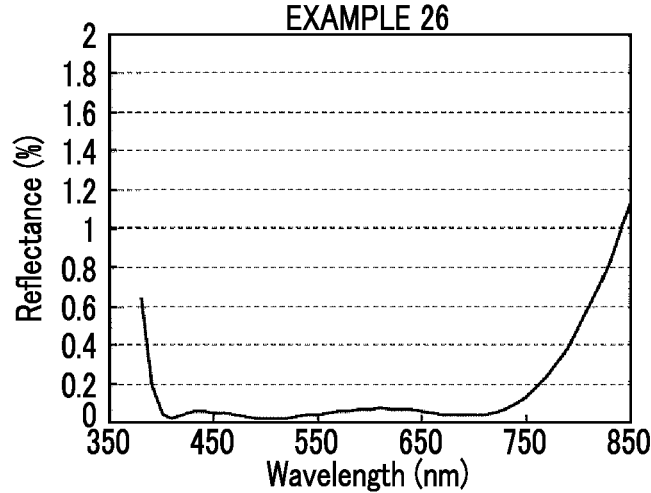
FIG. 33 is a view showing the wavelength dependence of the reflectance of an optical member of Example 26.

The wavelength dependence of the reflectance of Example 26 is shown in FIG. 33. As shown in FIG. 33, the antireflection film of Example 26 exhibited a reflectance of 0.1 or less in a wide range including a visible light region of a wavelength of 390 to 740 nm and good antireflection properties were obtained.

The wavelength dependence of the reflectance of Example 27 is shown in FIG. 34. As shown in FIG. 34, the antireflection film of Example 27 exhibited a reflectance of 0.1 or less in a wide range including a visible light region of a wavelength of 390 to 740 nm and good antireflection properties were obtained.

The wavelength dependence of the reflectance of Example 28 is shown in FIG. 35. As shown in FIG. 35, the antireflection film of Example 28 exhibited a reflectance of 0.1 or less in a wide range including a visible light region of a wavelength of 390 to 730 nm and good antireflection properties were obtained.

Accordingly, it is considered that the film thickness of the uneven structure layer is preferably 200 nm or more.

Example 29 to Example 33

In Examples 29 to 33, concave lenses (curvature radius: 17 mm) respectively made of the materials having refractive indices shown in Table 18 below were used as the substrates and the film thickness of the thin aluminum film as the precursor of the uneven structure layer was set to 10 nm. The intermediate layer was formed to have a six-layer structure formed by laminating odd-numbered layers of first, third and fifth layers, made of silicon oxynitride, and even-numbered layers of second, fourth and sixth layers, made of niobium oxide. The layer constitution from the substrate to the thin aluminum layer in each example is as shown in Table 18 below.

The wavelength dependence of the reflectance of each of Examples 29 to 33 obtained in the same manner as in Examples 14 to 18 is shown in FIGS. 36 to 40. When the wavelength dependence of the reflectance was obtained, for the refractive index of a boehmite layer obtained by forming an aluminum film having a film thickness of 10 nm and then treating the film with hot water, the refractive index distribution shown in FIG. 53 was used as in Examples 24 to 28.

TABLE 18

| Layer constitution | Material | Example 29 Film thickness (nm) | Example 30 Film thickness (nm) | Example 31 Film thickness (nm) | Example 32 Film thickness (nm) | Example 33 Film thickness (nm) |
|---|---|---|---|---|---|---|
| Precursor | Al | 10 | 10 | 10 | 10 | 10 |
| First layer | SiON | 39 | 43 | 45 | 47 | 50 |
| Second layer | $Nb_2O_5$ | 10 | 12 | 13 | 14 | 16 |
| Third layer | SiON | 17 | 17 | 16 | 16 | 16 |
| Fourth layer | $Nb_2O_5$ | 106 | 108 | 107 | 107 | 107 |
| Fifth layer | SiON | 24 | 20 | 17 | 15 | 11 |
| Sixth layer | $Nb_2O_5$ | 15 | 17 | 17 | 18 | 19 |
| Substrate | Refractive index | 1.659 | 1.777 | 1.812 | 1.889 | 2.013 |

As described above, in any of the antireflection films of Examples 24 to 28 having an eight-layer structure, a very wide wavelength bandwidth of 340 nm or more in which the reflectance is 0.1% or less was obtained. In Examples 24 to 28, the film thickness of the thin aluminum film as the precursor is 10 nm and the film thickness of the uneven structure layer is about 140 nm when referring to FIG. 7. As shown in Examples 24 to 28, when the intermediate layer was constituted such that the film thickness of the first layer was in a range of 54 to 56 nm, the film thickness of the second layer was 20 nm, the film thickness of the third layer was in a range of 14 to 15 nm, the film thickness of the fourth layer was in a range of 84 to 92 nm, the film thickness of the fifth layer was in a range of 7 to 16 nm, the film thickness of the sixth layer was in a range of 27 to 34 nm, the film thickness of the seventh layer was in a range of 16 to 37 nm, and the film thickness of the eighth layer was in a range of 9 to 15 nm, respectively, good antireflection performance could be obtained. In a comparison of Examples 24 to 28 with Examples 14 to 23 above, in Examples 14 to 23, the film thickness of the uneven structure layer was large and the bandwidth in which reflection can be prevented was wide.

Here, it is assumed that as the substrates, a substrate of S-NBH5 (manufactured by Ohara Inc., refractive index: 1.659) is used in Example 29, a substrate of S-LAH66 (manufactured by Ohara Inc., refractive index: 1.777) is used in Example 30, a substrate of S-LAH53 (manufactured by Ohara Inc., refractive index: 1.812) is used in Example 31, a substrate of S-LAH58 (manufactured by Ohara Inc., refractive index: 1.889) is used in Example 32, and a substrate of S-LAH79 (manufactured by Ohara Inc., refractive index: 2.013) is used in Example 33, respectively.

The wavelength dependence of the reflectance of Example 29 is shown in FIG. 36. As shown in FIG. 36, the antireflection film of Example 29 exhibited a reflectance of 0.1 or less in a wide range including a visible light region of a wavelength of 410 to 720 nm and good antireflection properties were obtained.

Figure 37:
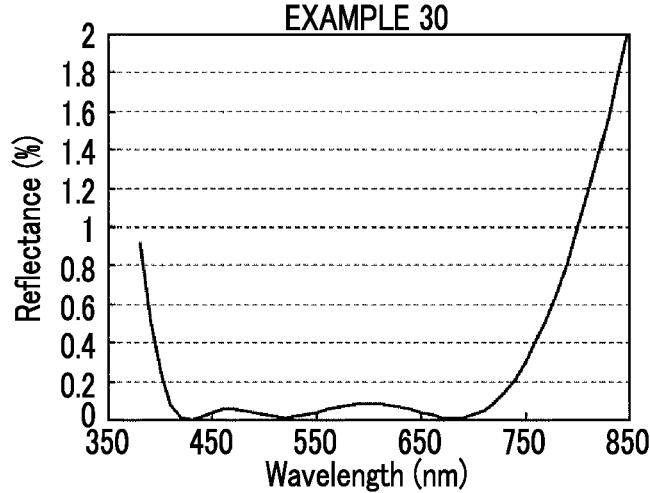
FIG. 37 is a view showing the wavelength dependence of the reflectance of an optical member of Example 30.

The wavelength dependence of the reflectance of Example 30 is shown in FIG. 37. As shown in FIG. 37, the antireflection film of Example 30 exhibited a reflectance of 0.1 or less in a wide range including a visible light region of a wavelength of 410 to 720 nm and good antireflection properties were obtained.

Figure 38:
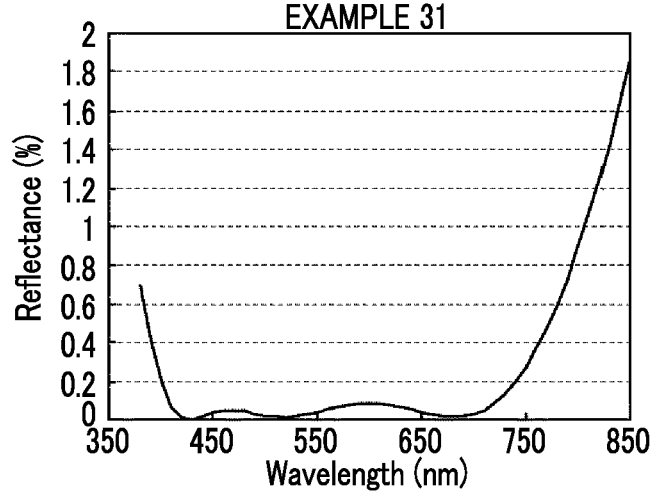
FIG. 38 is a view showing the wavelength dependence of the reflectance of an optical member of Example 31.

The wavelength dependence of the reflectance of Example 31 is shown in FIG. 38. As shown in FIG. 38, the antireflection film of Example 31 exhibited a reflectance of 0.1 or less in a wide range including a visible light region of a wavelength of 410 to 720 nm and good antireflection properties were obtained.

Figure 39:
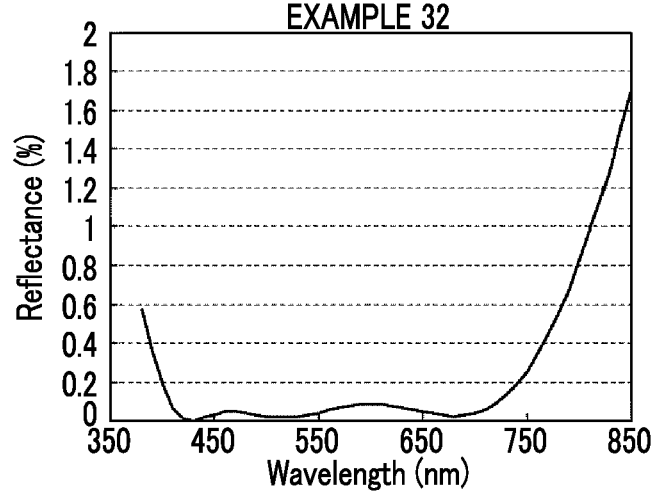
FIG. 39 is a view showing the wavelength dependence of the reflectance of an optical member of Example 32.

The wavelength dependence of the reflectance of Example 32 is shown in FIG. 39. As shown in FIG. 39, the antireflection film of Example 32 exhibited a reflectance of 0.1 or less in a wide range including a visible light region of a wavelength of 410 to 720 nm and good antireflection properties were obtained.

Figure 40:
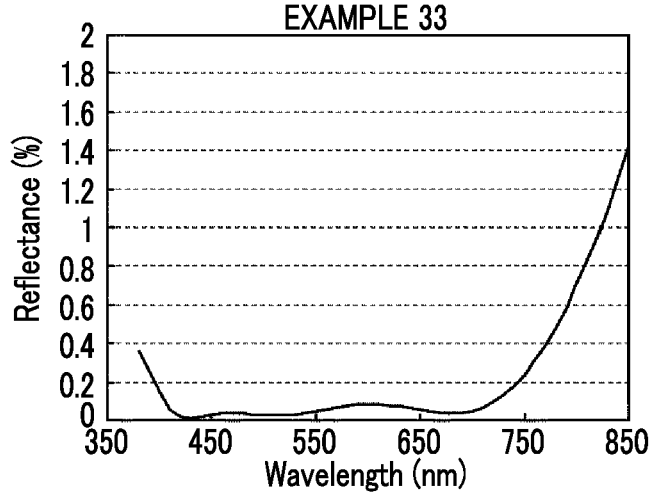
FIG. 40 is a view showing the wavelength dependence of the reflectance of an optical member of Example 33.

The wavelength dependence of the reflectance of Example 33 is shown in FIG. 40. As shown in FIG. 40, the antireflection film of Example 33 exhibited a reflectance of 0.1 or less in a wide range including a visible light region of a wavelength of 410 to 720 nm and good antireflection properties were obtained.

As described above, in any of the antireflection films of Examples 29 to 33 having a six-layer structure, a very wide wavelength bandwidth of 310 nm or more in which the reflectance is 0.1% or less was obtained. In Examples 29 to 33, the film thickness of the thin aluminum film as the precursor is 10 nm and the film thickness of the uneven structure layer is about 140 nm when referring to FIG. 7. As shown in Examples 29 to 33, when the intermediate layer was constituted such that the film thickness of the first layer was in a range of 39 to 50 nm, the film thickness of the second layer was in a range of 10 to 16 nm, the film thickness of the third layer was in a range of 16 to 17 nm, the film thickness of the fourth layer was in a range of 106 to 108 nm, the film thickness of the fifth layer was in a range of 11 to 24 nm, and the film thickness of the sixth layer was in a range of 15 to 19 nm, respectively, preferable antireflection performance could be obtained.

Example 34 to Example 38

In Examples 34 to 38, concave lenses (curvature radius: 17 mm) respectively made of the materials having refractive indices shown in Table 19 below were used as the substrates and the film thickness of the thin aluminum film as the precursor of the uneven structure layer was set to 16 nm. The intermediate layer was formed to have a six-layer structure formed by laminating odd-numbered layers of first, third and fifth layers, made of silicon oxynitride, and even-numbered layers of second, fourth and sixth layers, made of niobium oxide. The layer constitution from the substrate to the thin aluminum layer in each example is as shown in Table 19 below.

The wavelength dependence of the reflectance of each of Examples 34 to 38 obtained in the same manner as in Examples 14 to 18 is shown in FIGS. 41 to 45. When the wavelength dependence of the reflectance was obtained, for the refractive index of a boehmite layer obtained by forming an aluminum film having a film thickness of 16 nm and then treating the film with hot water, the refractive index distribution shown in FIG. 51 was used as in Examples 14 to 18.

TABLE 19

| Layer constitution | Material | Example 34 Film thickness (nm) | Example 35 Film thickness (nm) | Example 36 Film thickness (nm) | Example 37 Film thickness (nm) | Example 38 Film thickness (nm) |
| --- | --- | --- | --- | --- | --- | --- |
| Precursor | Al | 16 | 16 | 16 | 16 | 16 |
| First layer | SiON | 31 | 37 | 40 | 42 | 47 |
| Second layer | $Nb_2O_5$ | 10 | 12 | 12 | 13 | 15 |
| Third layer | SiON | 26 | 24 | 23 | 23 | 22 |
| Fourth layer | $Nb_2O_5$ | 114 | 117 | 119 | 120 | 123 |
| Fifth layer | SiON | 23 | 19 | 17 | 16 | 12 |
| Sixth layer | $Nb_2O_5$ | 16 | 18 | 18 | 19 | 19 |
| Substrate | Refractive index | 1.659 | 1.777 | 1.812 | 1.889 | 2.013 |

Here, it is assumed that as the substrates, a substrate of S-NBH5 (manufactured by Ohara Inc., refractive index: 1.659) is used in Example 34, a substrate of S-LAH66 (manufactured by Ohara Inc., refractive index: 1.777) is used in Example 35, a substrate of S-LAH53 (manufactured by Ohara Inc., refractive index: 1.812) is used in Example 36, a substrate of S-LAH58 (manufactured by Ohara Inc., refractive index: 1.889) is used in Example 37, and a substrate of S-LAH79 (manufactured by Ohara Inc., refractive index: 2.013) is used in Example 38, respectively.

Figure 41:
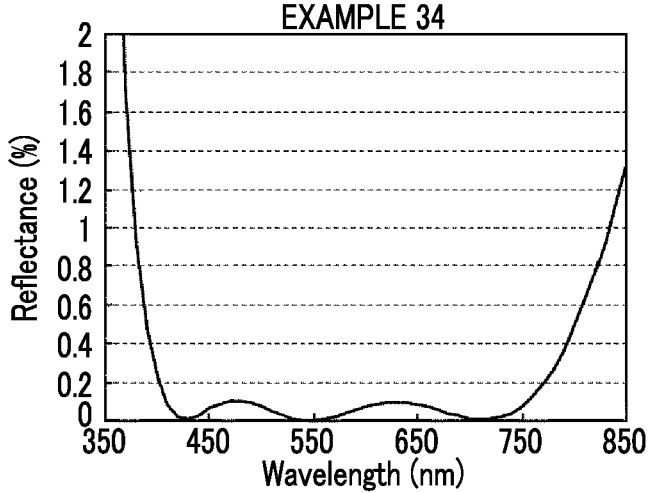
FIG. 41 is a view showing the wavelength dependence of the reflectance of an optical member of Example 34.

The wavelength dependence of the reflectance of Example 34 is shown in FIG. 41. As shown in FIG. 41, the antireflection film of Example 34 exhibited a reflectance of 0.1 or less in a wide range including a visible light region of a wavelength of 410 to 750 nm and good antireflection properties were obtained.

Figure 42:
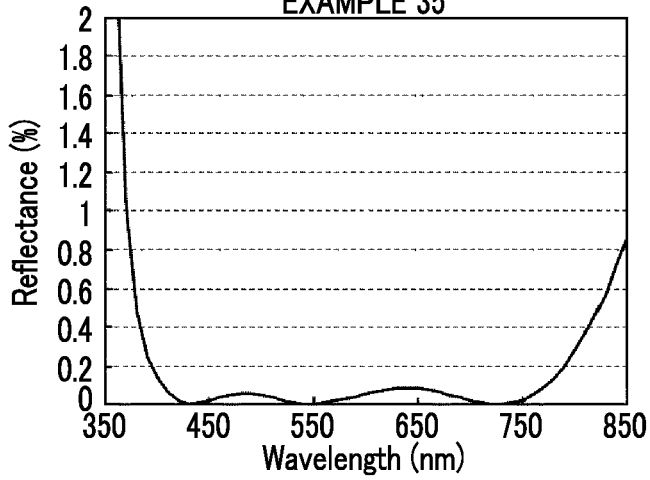
FIG. 42 is a view showing the wavelength dependence of the reflectance of an optical member of Example 35.

The wavelength dependence of the reflectance of Example 35 is shown in FIG. 42. As shown in FIG. 42, the antireflection film of Example 35 exhibited a reflectance of 0.1 or less in a wide range including a visible light region of a wavelength of 410 to 770 nm and good antireflection properties were obtained.

Figure 43:
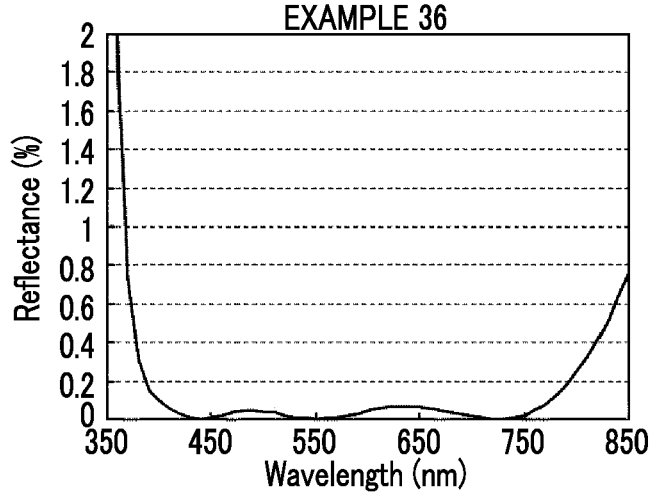
FIG. 43 is a view showing the wavelength dependence of the reflectance of an optical member of Example 36.

The wavelength dependence of the reflectance of Example 36 is shown in FIG. 43. As shown in FIG. 43, the antireflection film of Example 36 exhibited a reflectance of 0.1 or less in a wide range including a visible light region of a wavelength of 400 to 770 nm and good antireflection properties were obtained.

Figure 44:
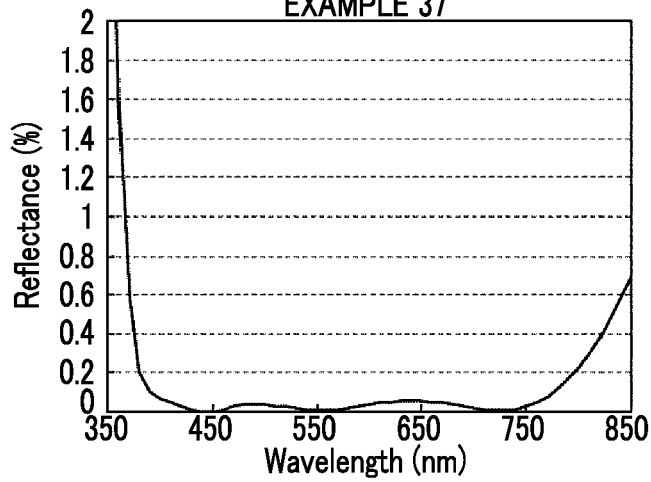
FIG. 44 is a view showing the wavelength dependence of the reflectance of an optical member of Example 37.

The wavelength dependence of the reflectance of Example 37 is shown in FIG. 44. As shown in FIG. 44, the antireflection film of Example 37 exhibited a reflectance of 0.1 or less in a wide range including a visible light region of a wavelength of 390 to 780 nm and good antireflection properties were obtained.

Figure 45:
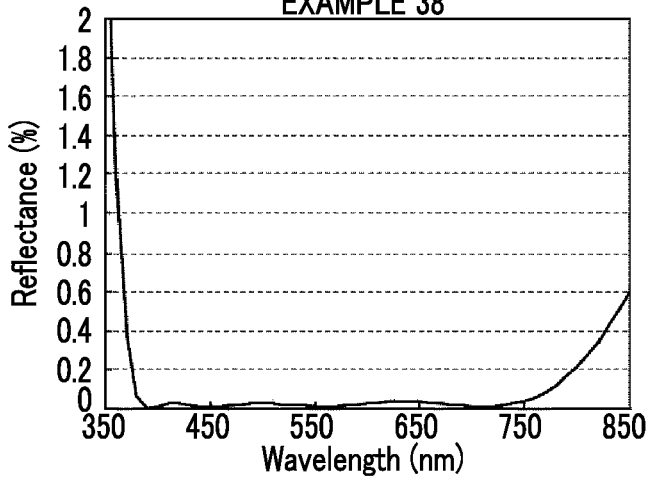
FIG. 45 is a view showing the wavelength dependence of the reflectance of an optical member of Example 38.

The wavelength dependence of the reflectance of Example 38 is shown in FIG. 45. As shown in FIG. 45, the antireflection film of Example 38 exhibited a reflectance of 0.1 or less in a wide range including a visible light region of a wavelength of 380 to 770 nm and good antireflection properties were obtained.

As described above, in any of the antireflection films of Examples 34 to 38 having a six-layer structure, a wide wavelength bandwidth of 340 nm or more in which the reflectance is 0.1% or less is obtained. In Examples 34 to 38, the film thickness of the thin aluminum film as the precursor is 16 nm (the film thickness of the uneven structure layer is about 210 nm when referring to FIG. 7). As shown in Examples 34 to 38, when the intermediate layer was constituted such that the film thickness of the first layer was in a range of 30 to 50 nm, the film thickness of the second layer was in a range of 10 to 15 nm, the film thickness of the third layer was in a range of 22 to 26 nm, the film thickness of the fourth layer was in a range of 114 to 123 nm, the film thickness of the fifth layer was in a range of 12 to 23 nm, and the film thickness of the sixth layer was in a range of 16 to 19 nm, very preferable antireflection performance could be obtained. Particularly, in the case in which the antireflection film was provided on the substrate having a refractive index of 1.75 to 2.02, a wavelength bandwidth of 360 nm or more in which the reflectance is 0.1% or less was obtained.

Example 39 to Example 43

In Examples 39 to 43, concave lenses (curvature radius: 17 mm) respectively made of the materials having refractive indices shown in Table 20 below were used as the substrates and the film thickness of the thin aluminum film as the precursor of the uneven structure layer was set to 20 nm. The intermediate layer was formed to have a six-layer structure formed by laminating odd-numbered layers of first, third and fifth layers, made of silicon oxynitride, and even-numbered layers of second, fourth and sixth layers, made of niobium oxide. The layer constitution from the substrate to the thin aluminum layer in each example is as shown in Table 20 below.

The wavelength dependence of the reflectance of each of Examples 39 to 43 obtained in the same manner as in Examples 14 to 18 is shown in FIGS. 46 to 50. When the wavelength dependence of the reflectance was obtained, for the refractive index of a boehmite layer obtained by forming an aluminum film having a film thickness of 20 nm and then treating the film with hot water, the refractive index distribution shown in FIG. 52 was used as in Examples 19 to 23.

Here, it is assumed that as the substrates, a substrate of S-NBH5 (manufactured by Ohara Inc., refractive index: 1.659) is used in Example 39, a substrate of S-LAH66 (manufactured by Ohara Inc., refractive index: 1.777) is used in Example 40, a substrate of S-LAH53 (manufactured by Ohara Inc., refractive index: 1.812) is used in Example 41, a substrate of S-LAH58 (manufactured by Ohara Inc., refractive index: 1.889) is used in Example 42, and a substrate of S-LAH79 (manufactured by Ohara Inc., refractive index: 2.013) is used in Example 43, respectively.

Figure 46:
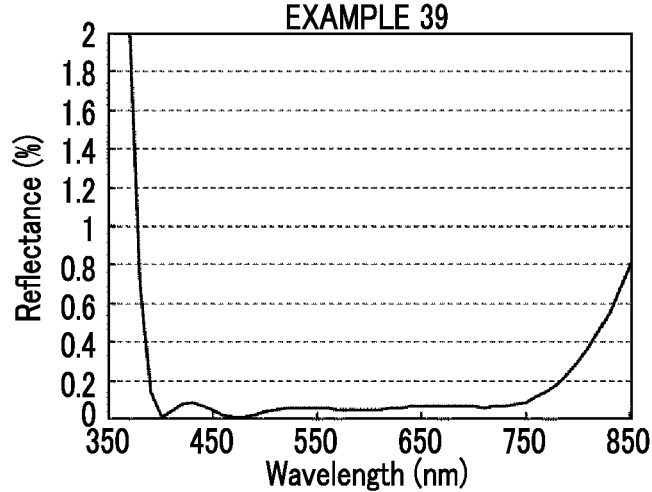
FIG. 46 is a view showing the wavelength dependence of the reflectance of an optical member of Example 39.

The wavelength dependence of the reflectance of Example 39 is shown in FIG. 46. As shown in FIG. 46, the antireflection film of Example 39 exhibited a reflectance of 0.1 or less in a wide range including a visible light region of a wavelength of 390 to 750 nm and good antireflection properties were obtained.

Figure 47:
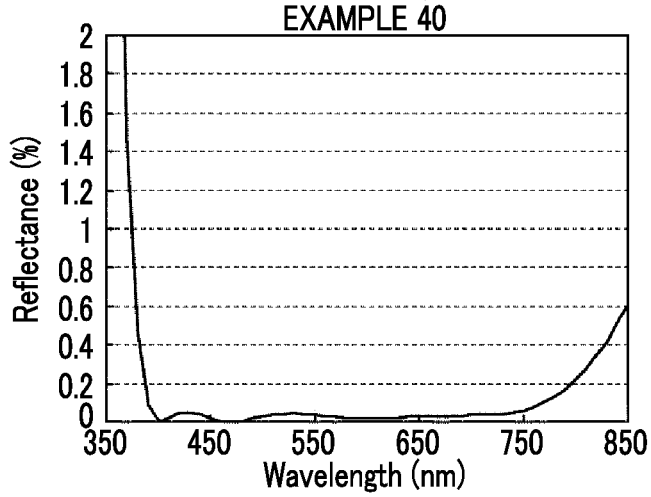
FIG. 47 is a view showing the wavelength dependence of the reflectance of an optical member of Example 40.

The wavelength dependence of the reflectance of Example 40 is shown in FIG. 47. As shown in FIG. 47, the antireflection film of Example 40 exhibited a reflectance of 0.1 or less in a wide range including a visible light region of a wavelength of 390 to 760 nm and good antireflection properties were obtained.

Figure 48:
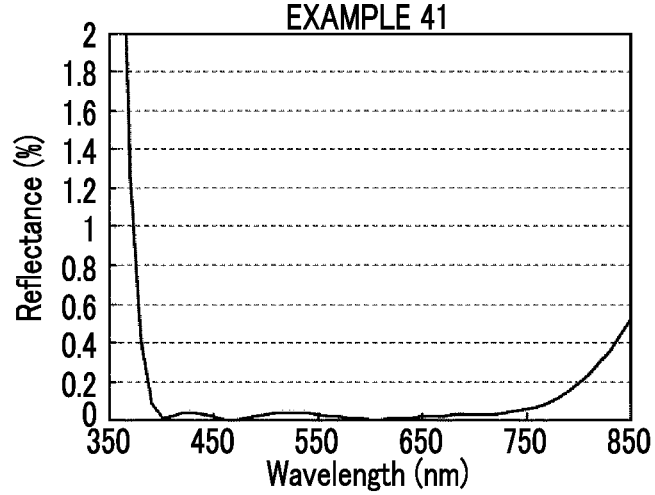
FIG. 48 is a view showing the wavelength dependence of the reflectance of an optical member of Example 41.

The wavelength dependence of the reflectance of Example 41 is shown in FIG. 48. As shown in FIG. 48, the antireflection film of Example 41 exhibited a reflectance of 0.1 or less in a wide range including a visible light region of a wavelength of 390 to 770 nm and good antireflection properties were obtained.

Figure 49:
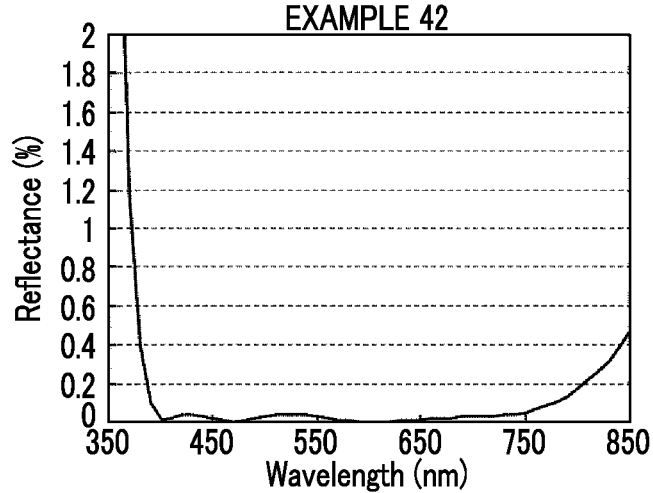
FIG. 49 is a view showing the wavelength dependence of the reflectance of an optical member of Example 42.

The wavelength dependence of the reflectance of Example 42 is shown in FIG. 49. As shown in FIG. 49, the antireflection film of Example 42 exhibited a reflectance of 0.1 or less in a wide range including a visible light region of a wavelength of 390 to 780 nm and good antireflection properties were obtained.

Figure 50:
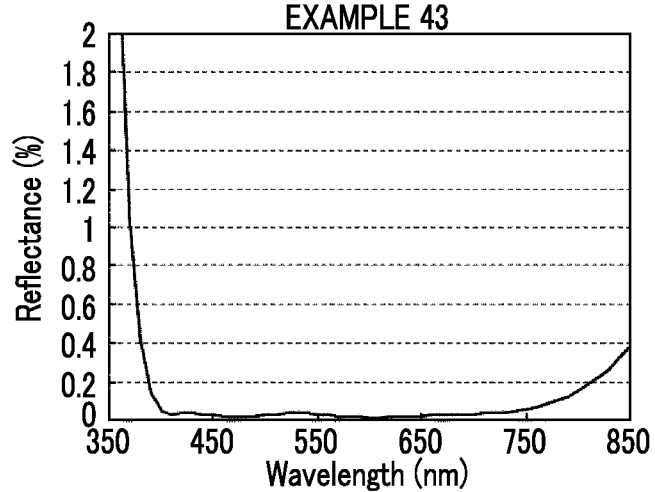
FIG. 50 is a view showing the wavelength dependence of the reflectance of an optical member of Example 43.

The wavelength dependence of the reflectance of Example 43 is shown in FIG. 50. As shown in FIG. 50, the antireflection film of the Example 43 exhibited a reflectance of 0.1 or less in a wide range including a visible light region of a wavelength of 400 to 780 nm and good antireflection properties were obtained.

As described above, in any of the antireflection films of Examples 39 to 43 having a six-layer structure, a wide wavelength bandwidth of 360 nm or more in which the reflectance is 0.1% or less is obtained. In Examples 39 to 43, the film thickness of the thin aluminum film as the precursor is 20 nm and the film thickness of the uneven structure layer is about 230 nm when referring to FIG. 7. As shown in Examples 39 to 43, when the intermediate layer was constituted such that the film thickness of the first layer was in a range of 23 to 41 nm, the film thickness of the second layer was in a range of 12 to 15 nm, the film thickness of the third layer was in a range of 23 to 28 nm, the film thickness of the fourth layer was in a range of 118 to 124 nm, the film thickness of the fifth layer was in a range of 12 to 23 nm, and

TABLE 20

| Layer constitution | Material | Example 39 Film thickness (nm) | Example 40 Film thickness (nm) | Example 41 Film thickness (nm) | Example 42 Film thickness (nm) | Example 43 Film thickness (nm) |
|---|---|---|---|---|---|---|
| Precursor | Al | 20 | 20 | 20 | 20 | 20 |
| First layer | SiON | 23 | 29 | 32 | 35 | 41 |
| Second layer | $Nb_2O_5$ | 12 | 13 | 13 | 14 | 15 |
| Third layer | SiON | 28 | 26 | 25 | 24 | 23 |
| Fourth layer | $Nb_2O_5$ | 118 | 120 | 121 | 122 | 124 |
| Fifth layer | SiON | 23 | 19 | 17 | 15 | 12 |
| Sixth layer | $Nb_2O_5$ | 16 | 17 | 17 | 18 | 19 |
| Substrate | Refractive index | 1.659 | 1.777 | 1.812 | 1.889 | 2.013 | the film thickness of the sixth layer was in a range of 16 to 19 nm, respectively, preferably antireflection performance could be obtained. Particularly, in the case of the six-layer structure, as in the case of the eight-layer structure, when the film thickness of the uneven structure layer was 200 nm or more, the bandwidth in which reflection can be prevented was wider than in the case in which the film thickness of the uneven structure layer was 140 nm. That is, from the viewpoint of preventing reflection, it is preferable that the film thickness of the uneven structure layer is 200 nm or more.

In the optical member of any of these examples, since a thin aluminum film having a film thickness of less than 30 nm is used as the precursor of the uneven structure layer, it is possible to obtain the effect of sufficiently suppressing the scattered light intensity of incident light.

EXPLANATION OF REFERENCES

1: optical member
2: substrate
3: antireflection film
5: intermediate layer
10: uneven structure layer
51: first layer
52: second layer
53: third layer
54: fourth layer
55: fifth layer
56: sixth layer

What is claimed is:

1. An antireflection film that is provided on a surface of a substrate, the film comprising:
    an uneven structure layer that has an uneven structure in which a distance between protrusions is shorter than a wavelength of light of which reflection is to be suppressed, and that has an alumina hydrate as a main component; and
    an intermediate layer that is disposed between the uneven structure layer and the substrate, wherein:
    the uneven structure layer has a spatial frequency peak value of the uneven structure of $8.5\ \mu m^{-1}$ or greater, and has a film thickness of 200 nm or more and 250 nm or less, and has a refractive index profile in a film thickness direction that gradually increases from a surface toward a first peak between the surface and a central point, in the film thickness direction, of the uneven structure layer with a first gradient, decreases toward the intermediate layer side of the first peak, gradually increases toward a maximum peak between the central point and an interface between the uneven structure layer and the intermediate layer with a second gradient that is greater than the first gradient, and becomes smaller than the maximum peak by 3% or more toward the interface, wherein a refractive index difference between the first peak and the maximum peak is 0.2 or greater,
    the intermediate layer comprises a plurality of layers including at least a first layer, a second layer, a third layer, and a fourth layer in this order from the uneven structure layer side to the substrate side,
    the first layer has a refractive index of less than 1.7 and a film thickness of 3 nm or more and 80 nm or less,
    the second layer has a refractive index of 1.7 or more and a film thickness of 3 nm or more and 30 nm or less,
    the third layer has a refractive index of less than 1.7 and a film thickness of 10 nm or more and 80 nm or less, and
    the fourth layer has a refractive index of 1.7 or more and a film thickness of 3 nm or more and 160 nm or less.

2. The antireflection film according to claim 1, wherein the intermediate layer further includes a fifth layer on the substrate side of the fourth layer, and
    the fifth layer has a refractive index of less than 1.7 and a film thickness of 3 nm or more and 50 nm or less.

3. The antireflection film according to claim 2, wherein the intermediate layer further includes a sixth layer on the substrate side of the fifth layer, and
    the sixth layer has a refractive index of 1.7 or more and a film thickness of 3 nm or more and 40 nm or less.

4. The antireflection film according to claim 3, wherein the intermediate layer further includes a seventh layer on the substrate side of the sixth layer, and
    the seventh layer has a refractive index of less than 1.7 and a film thickness of 3 nm or more and 80 nm or less.

5. The antireflection film according to claim 4, wherein the intermediate layer further includes an eighth layer on the substrate side of the seventh layer, and
    the eighth layer has a refractive index of 1.7 or more and a film thickness of 3 nm or more and 30 nm or less.

6. The antireflection film according to claim 5,
    wherein the uneven structure layer has a film thickness of 210 nm,
    among the plurality of layers constituting the intermediate layer, odd-numbered layers are made of silicon oxynitride and even-numbered layers are made of niobium oxide,
    the first layer has a film thickness of from 50 nm to 56 nm,
    the second layer has a film thickness of from 15 nm to 17 nm,
    the third layer has a film thickness of 21 nm,
    the fourth layer has a film thickness of from 120 nm to 135 nm,
    the fifth layer has a film thickness of from 11 nm to 19 nm,
    the sixth layer has a film thickness of from 26 nm to 37 nm,
    the seventh layer has a film thickness of from 17 nm to 38 nm, and
    the eighth layer has a film thickness of from 10 nm to 16 nm.

7. The antireflection film according to claim 5,
    wherein the uneven structure layer has a film thickness of 230 nm,
    among the plurality of layers constituting the intermediate layer, odd-numbered layers are made of silicon oxynitride and even-numbered layers are made of niobium oxide,
    the first layer has a film thickness of from 42 nm to 46 nm,
    the second layer has a film thickness of from 15 nm to 16 nm,
    the third layer has a film thickness of from 23 nm to 24 nm,
    the fourth layer has a film thickness of from 123 nm to 129 nm,
    the fifth layer has a film thickness of from 12 nm to 20 nm,
    the sixth layer has a film thickness of from 24 nm to 36 nm,
    the seventh layer has a film thickness of from 18 nm to 37 nm, and
    the eighth layer has a film thickness of from 8 nm to 16 nm.

8. The antireflection film according to claim 3,
wherein the uneven structure layer has a film thickness of 210 nm,
among the plurality of layers constituting the intermediate layer, odd-numbered layers are made of silicon oxynitride and even-numbered layers are made of niobium oxide,
the first layer has a film thickness of from 31 nm to 47 nm,
the second layer has a film thickness of from 10 nm to 15 nm,
the third layer has a film thickness of from 22 nm to 26 nm,
the fourth layer has a film thickness of from 114 nm to 123 nm,
the fifth layer has a film thickness of from 12 nm to 23 nm, and
the sixth layer has a film thickness of from 16 nm to 19 nm.

9. The antireflection film according to claim 3,
wherein the uneven structure layer has a film thickness of 230 nm,
among the plurality of layers constituting the intermediate layer, odd-numbered layers are made of silicon oxynitride and even-numbered layers are made of niobium oxide,
the first layer has a film thickness of from 23 nm to 41 nm,
the second layer has a film thickness of from 12 nm to 15 nm,
the third layer has a film thickness of from 23 nm to 28 nm,
the fourth layer has a film thickness of from 118 nm to 124 nm,
the fifth layer has a film thickness of from 12 nm to 23 nm, and
the sixth layer has a film thickness of from 16 nm to 19 nm.

10. An optical member comprising:
the antireflection film according to claim 1; and
a transparent substrate having a surface on which the antireflection film is formed.

11. The optical member according to claim 10, wherein a refractive index of the transparent substrate is 1.65 or more and 2.10 or less.

12. An antireflection film that is provided on a surface of a substrate, the film comprising:
an uneven structure layer that has an uneven structure in which a distance between protrusions is shorter than a wavelength of light of which reflection is to be suppressed, and that has an alumina hydrate as a main component; and
an intermediate layer that is disposed between the uneven structure layer and the substrate, wherein:
the uneven structure layer is obtained by treating an aluminum film with hot water, and has a film thickness of 200 nm or more and 250 nm or less, and has a refractive index profile in a film thickness direction that gradually increases from a surface toward a first peak between the surface and a central point, in the film thickness direction, of the uneven structure layer with a first gradient, decreases toward the intermediate layer side of the first peak, gradually increases toward a maximum peak between the central point and an interface between the uneven structure layer and the intermediate layer with a second gradient that is greater than the first gradient, and becomes smaller than the maximum peak by 3% or more toward the interface, wherein
a refractive index difference between the first peak and the maximum peak is 0.2 or greater,
the intermediate layer comprises a plurality of layers including at least a first layer, a second layer, a third layer, and a fourth layer in this order from the uneven structure layer side to the substrate side,
the first layer has a refractive index of less than 1.7 and a film thickness of 3 nm or more and 80 nm or less,
the second layer has a refractive index of 1.7 or more and a film thickness of 3 nm or more and 30 nm or less,
the third layer has a refractive index of less than 1.7 and a film thickness of 10 nm or more and 80 nm or less, and
the fourth layer has a refractive index of 1.7 or more and a film thickness of 3 nm or more and 160 nm or less.

13. The antireflection film according to claim 12, wherein
the intermediate layer further includes a fifth layer on the substrate side of the fourth layer, and
the fifth layer has a refractive index of less than 1.7 and a film thickness of 3 nm or more and 50 nm or less.

14. The antireflection film according to claim 13, wherein
the intermediate layer further includes a sixth layer on the substrate side of the fifth layer, and
the sixth layer has a refractive index of 1.7 or more and a film thickness of 3 nm or more and 40 nm or less.

15. The antireflection film according to claim 14, wherein
the intermediate layer further includes a seventh layer on the substrate side of the sixth layer, and
the seventh layer has a refractive index of less than 1.7 and a film thickness of 3 nm or more and 80 nm or less.

16. The antireflection film according to claim 15, wherein
the intermediate layer further includes an eighth layer on the substrate side of the seventh layer, and
the eighth layer has a refractive index of 1.7 or more and a film thickness of 3 nm or more and 30 nm or less.

17. The antireflection film according to claim 16,
wherein the uneven structure layer has a film thickness of 210 nm,
among the plurality of layers constituting the intermediate layer, odd-numbered layers are made of silicon oxynitride and even-numbered layers are made of niobium oxide,
the first layer has a film thickness of from 50 nm to 56 nm,
the second layer has a film thickness of from 15 nm to 17 nm,
the third layer has a film thickness of 21 nm,
the fourth layer has a film thickness of from 120 nm to 135 nm,
the fifth layer has a film thickness of from 11 nm to 19 nm,
the sixth layer has a film thickness of from 26 nm to 37 nm,
the seventh layer has a film thickness of from 17 nm to 38 nm, and
the eighth layer has a film thickness of from 10 nm to 16 nm.

18. The antireflection film according to claim 16,
wherein the uneven structure layer has a film thickness of 230 nm,
among the plurality of layers constituting the intermediate layer, odd-numbered layers are made of silicon oxynitride and even-numbered layers are made of niobium oxide,
the first layer has a film thickness of from 42 nm to 46 nm,
the second layer has a film thickness of from 15 nm to 16 nm,
the third layer has a film thickness of from 23 nm to 24 nm, the fourth layer has a film thickness of from 123 nm to 129 nm, the fifth layer has a film thickness of from 12 nm to 20 nm, the sixth layer has a film thickness of from 24 nm to 36 nm, the seventh layer has a film thickness of from 18 nm to 37 nm, and the eighth layer has a film thickness of from 8 nm to 16 nm.

19. The antireflection film according to claim 14, wherein the uneven structure layer has a film thickness of 210 nm, among the plurality of layers constituting the intermediate layer, odd-numbered layers are made of silicon oxynitride and even-numbered layers are made of niobium oxide, the first layer has a film thickness of from 31 nm to 47 nm, the second layer has a film thickness of from 10 nm to 15 nm, the third layer has a film thickness of from 22 nm to 26 nm, the fourth layer has a film thickness of from 114 nm to 123 nm, the fifth layer has a film thickness of from 12 nm to 23 nm, and the sixth layer has a film thickness of from 16 nm to 19 nm.

20. The antireflection film according to claim 14, wherein the uneven structure layer has a film thickness of 230 nm, among the plurality of layers constituting the intermediate layer, odd-numbered layers are made of silicon oxynitride and even-numbered layers are made of niobium oxide, the first layer has a film thickness of from 23 nm to 41 nm, the second layer has a film thickness of from 12 nm to 15 nm, the third layer has a film thickness of from 23 nm to 28 nm, the fourth layer has a film thickness of from 118 nm to 124 nm, the fifth layer has a film thickness of from 12 nm to 23 nm, and the sixth layer has a film thickness of from 16 nm to 19 nm.

21. An optical member comprising:

the antireflection film according to claim 12; and a transparent substrate having a surface on which the antireflection film is formed.

22. The optical member according to claim 21, wherein a refractive index of the transparent substrate is 1.65 or more and 2.10 or less.

23. A method of producing an antireflection film, the antireflection film being provided on a surface of a substrate and including an uneven structure layer that has an uneven structure in which a distance between protrusions is shorter than a wavelength of light of which reflection is to be suppressed and has an alumina hydrate as a main component, and an intermediate layer that is disposed between the uneven structure layer and the substrate, the method comprising:

forming the intermediate layer on the surface of the substrate;

forming an aluminum film having a film thickness of 15 nm or more and 20 nm or less on the outermost surface of the intermediate layer by vapor phase film formation; and forming an uneven structure layer having a film thickness of 200 nm or more and 250 nm or less as the uneven structure layer by treating the aluminum film with hot water, the uneven structure layer having a refractive index profile in a film thickness direction that gradually increases from a surface toward a first peak between the surface and a central point, in the film thickness direction, of the uneven structure layer with a first gradient, decreases toward the intermediate layer side of the first peak, gradually increases toward a maximum peak between the central point and an interface between the uneven structure layer and the intermediate layer with a second gradient that is greater than the first gradient, and becomes smaller than the maximum peak by 3% or more toward the interface, wherein a refractive index difference between the first peak and the maximum peak is 0.2 or greater.

\* \* \* \* \*